Jan. 3, 1933.  H. R. BRAND  1,893,013
TOKEN DELIVERING MACHINE
Filed May 16, 1927  21 Sheets-Sheet 4
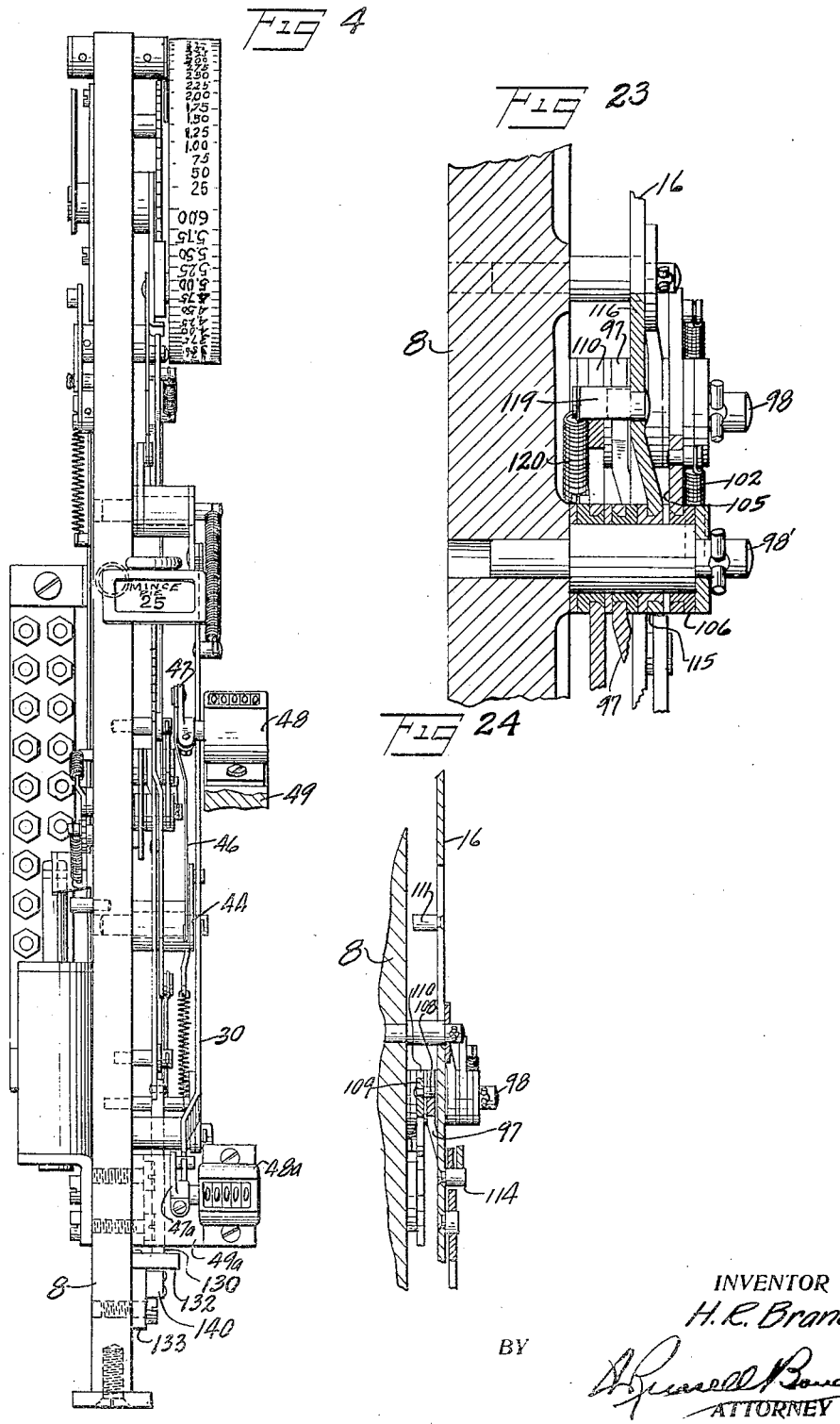
INVENTOR
H. R. Brand
BY
H. Russell Brand
ATTORNEY

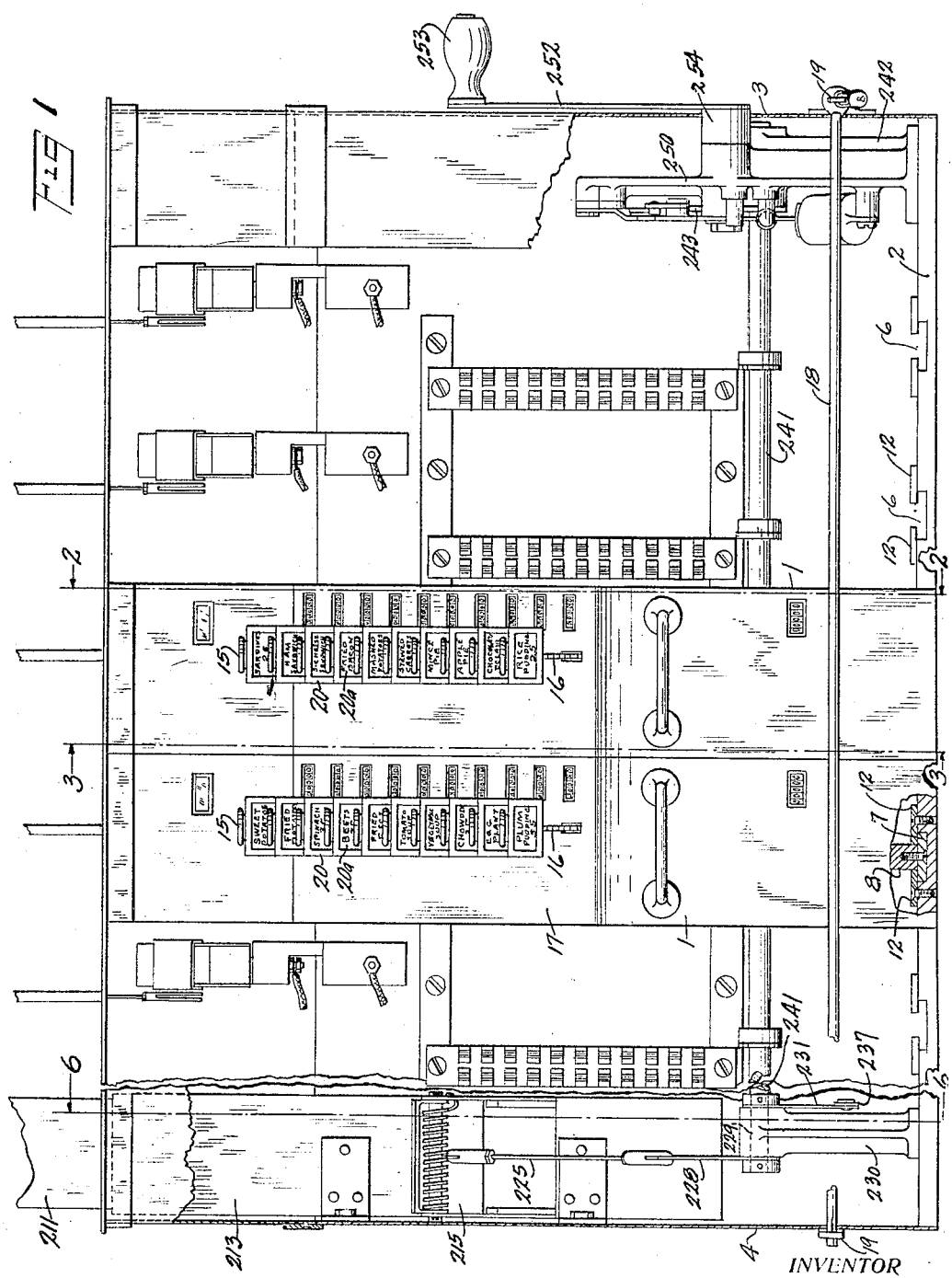

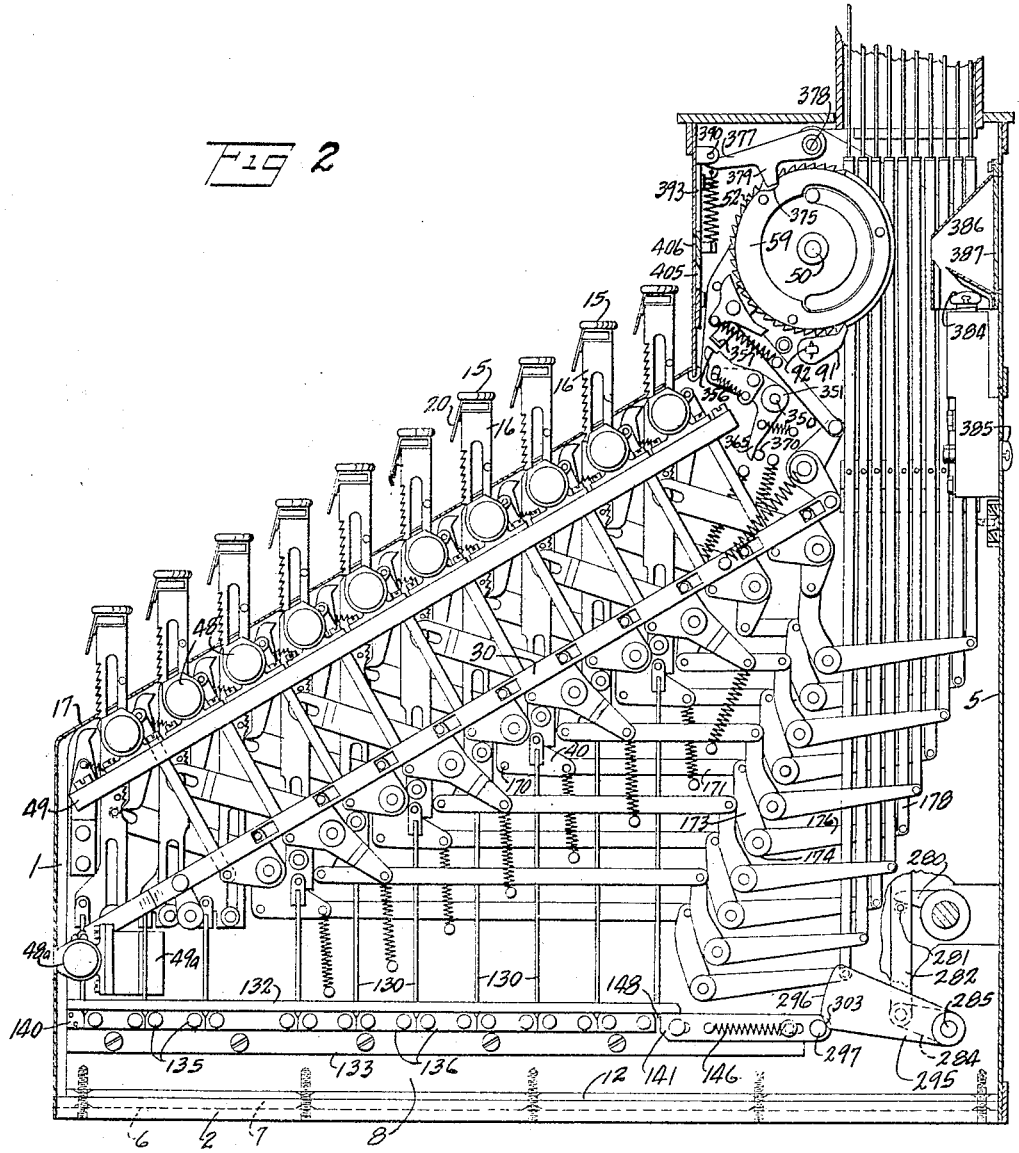

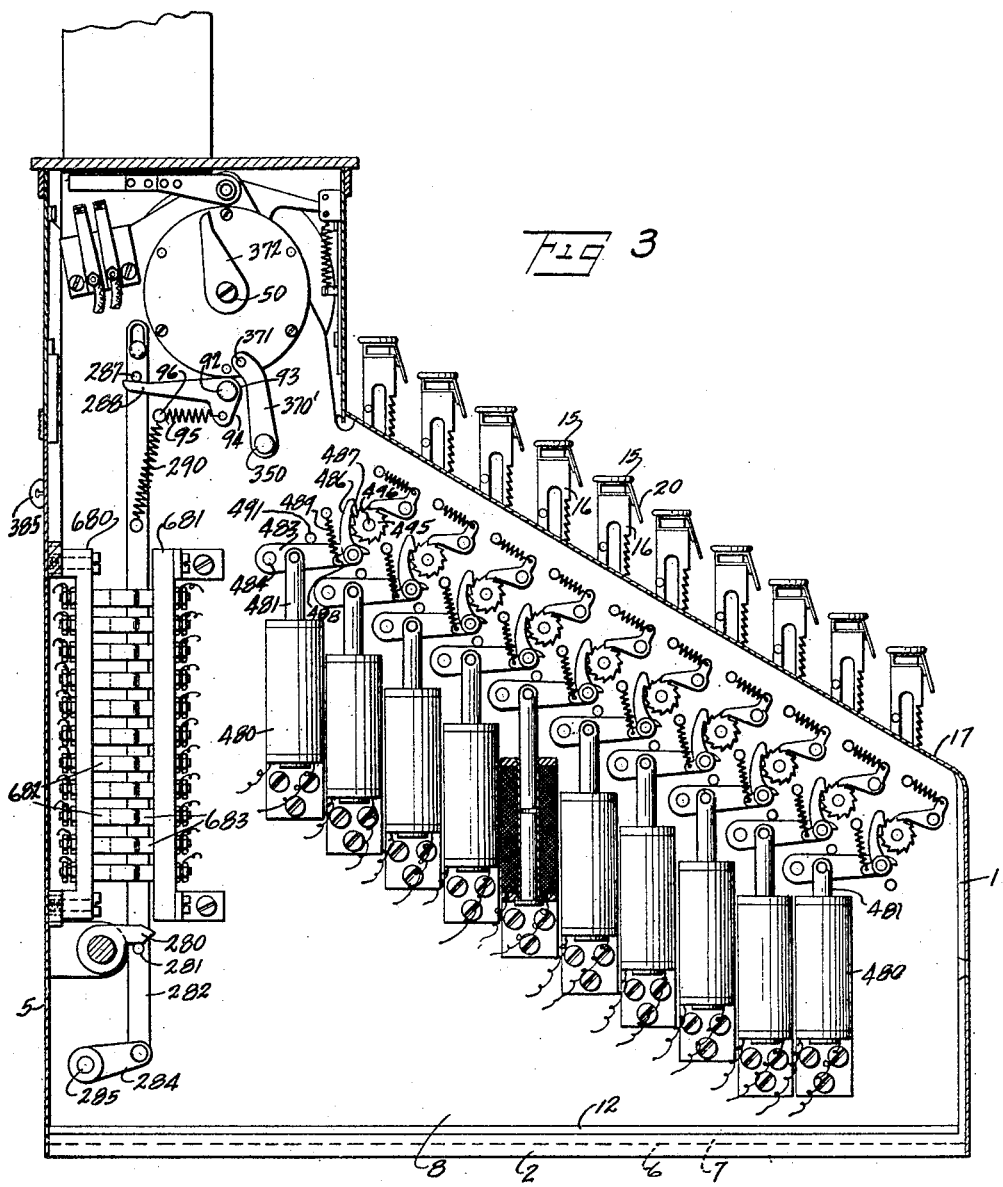

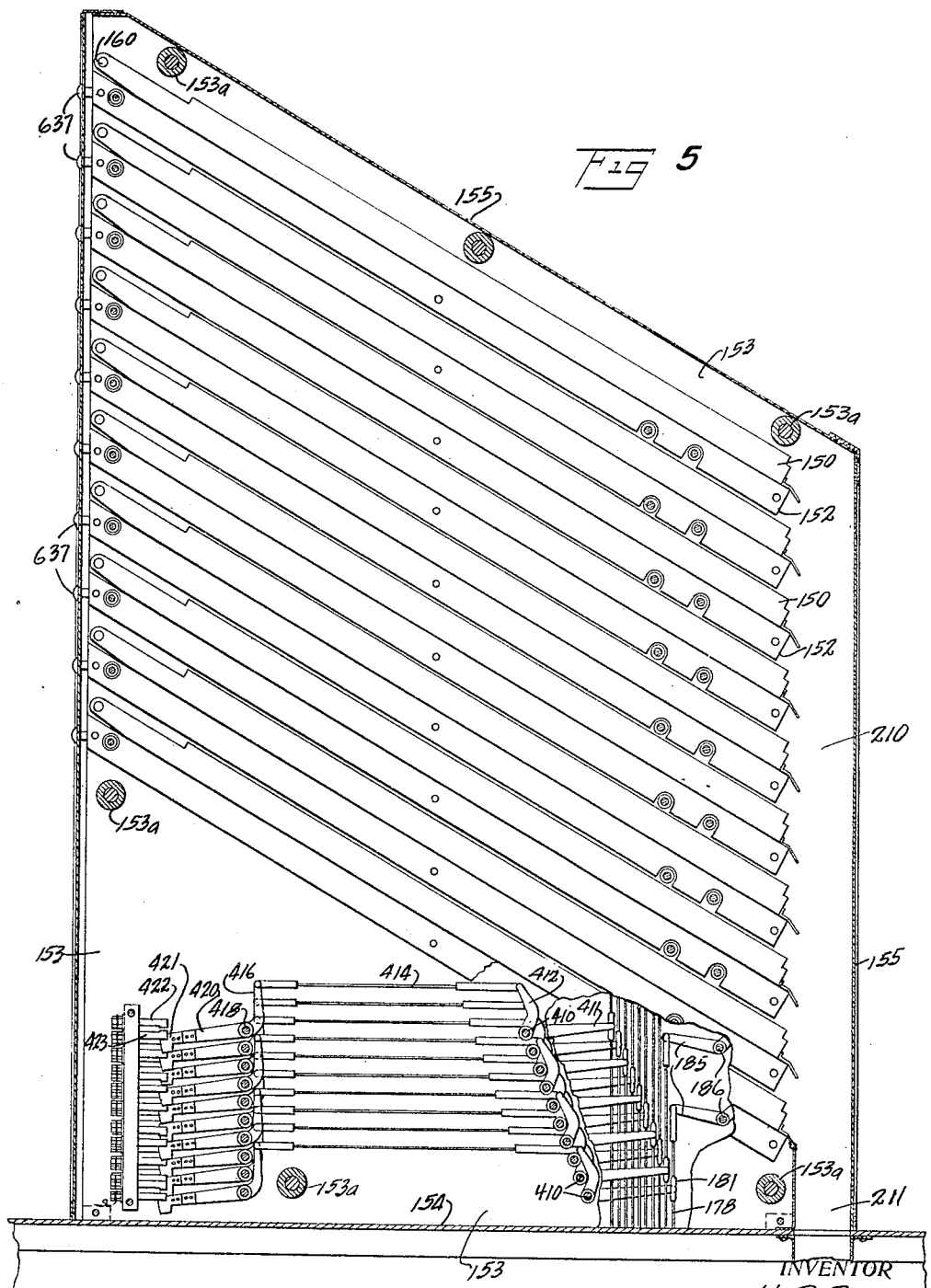

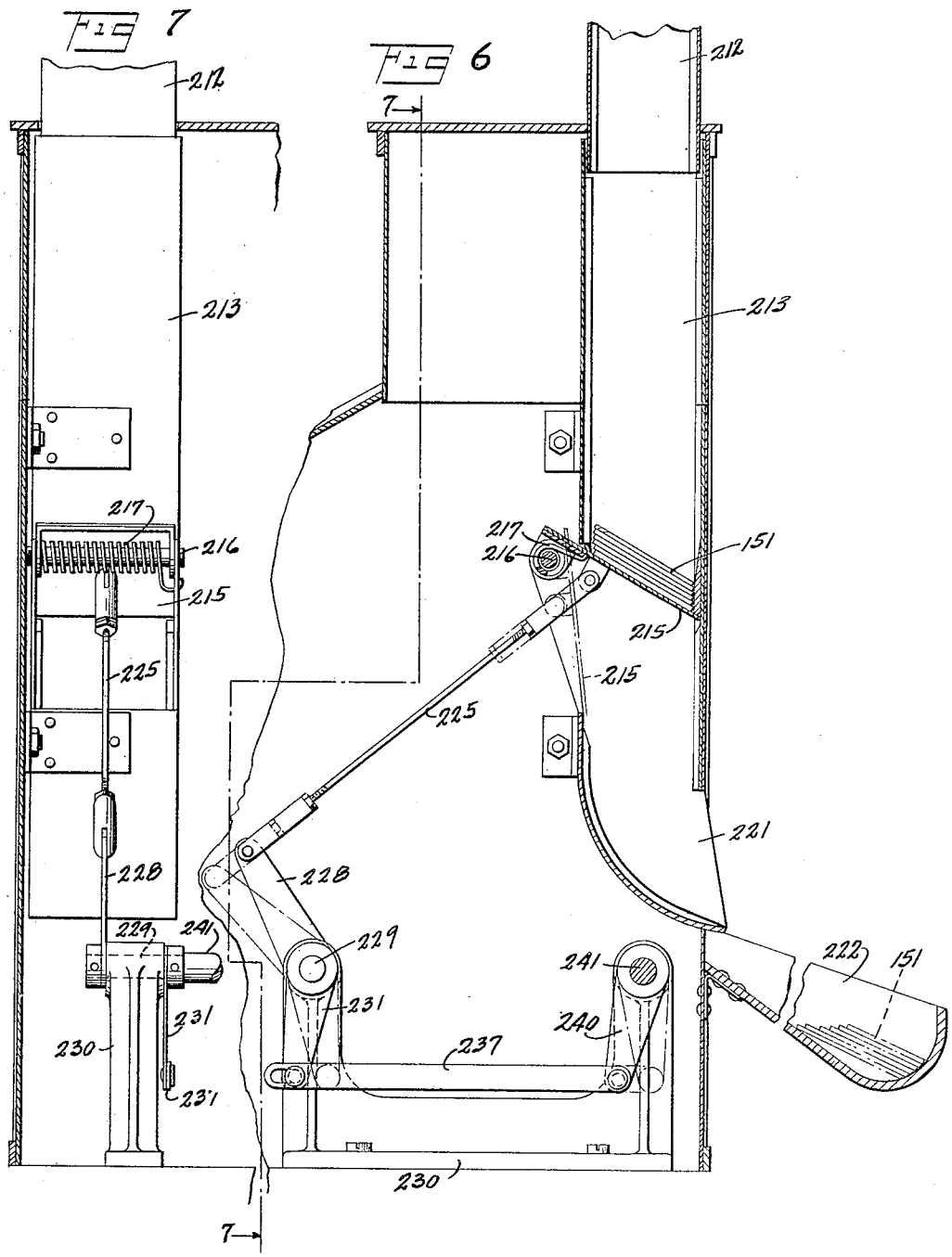

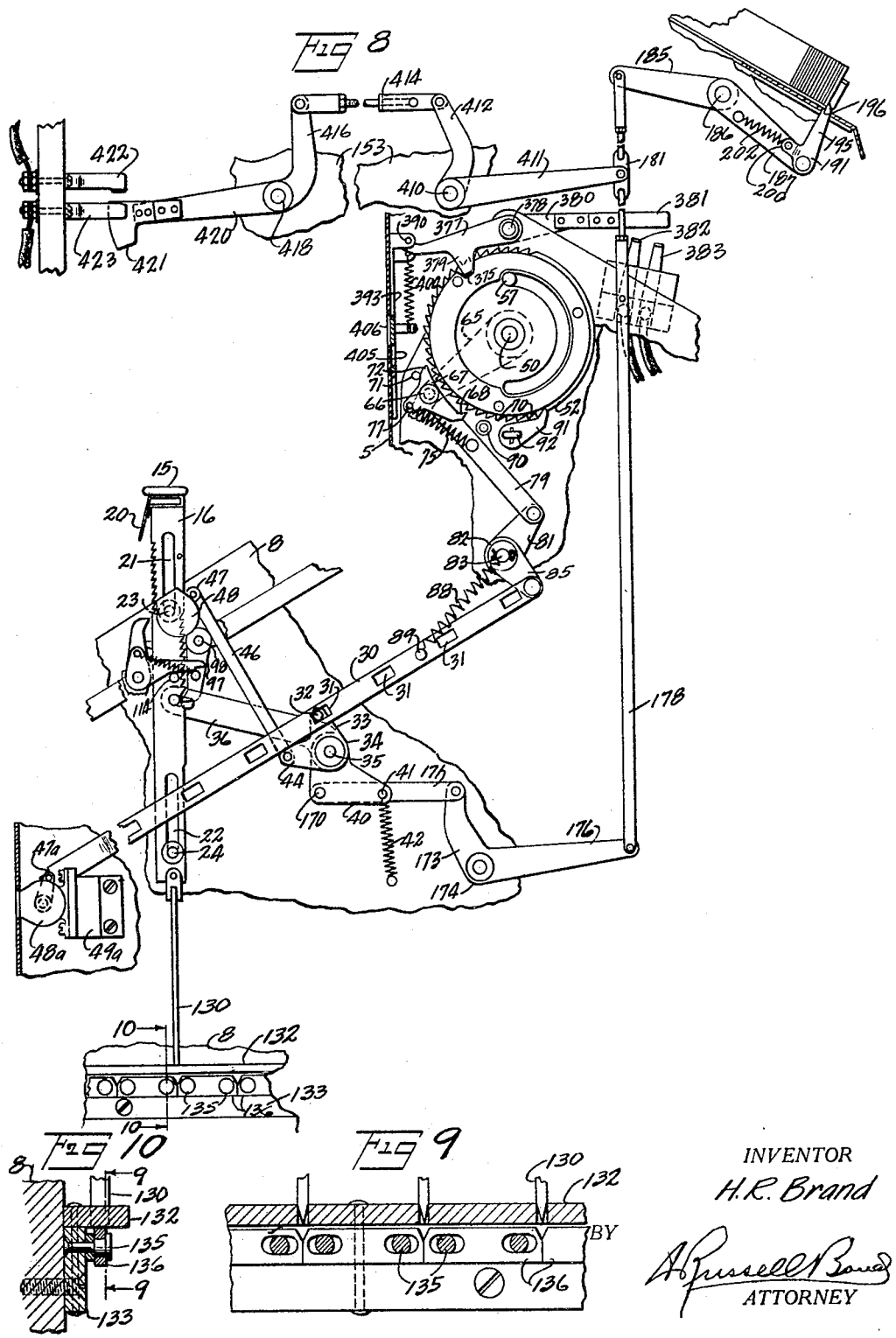

Jan. 3, 1933.                H. R. BRAND                1,893,013
                        TOKEN DELIVERING MACHINE
                  Filed May 16, 1927        21 Sheets-Sheet 8
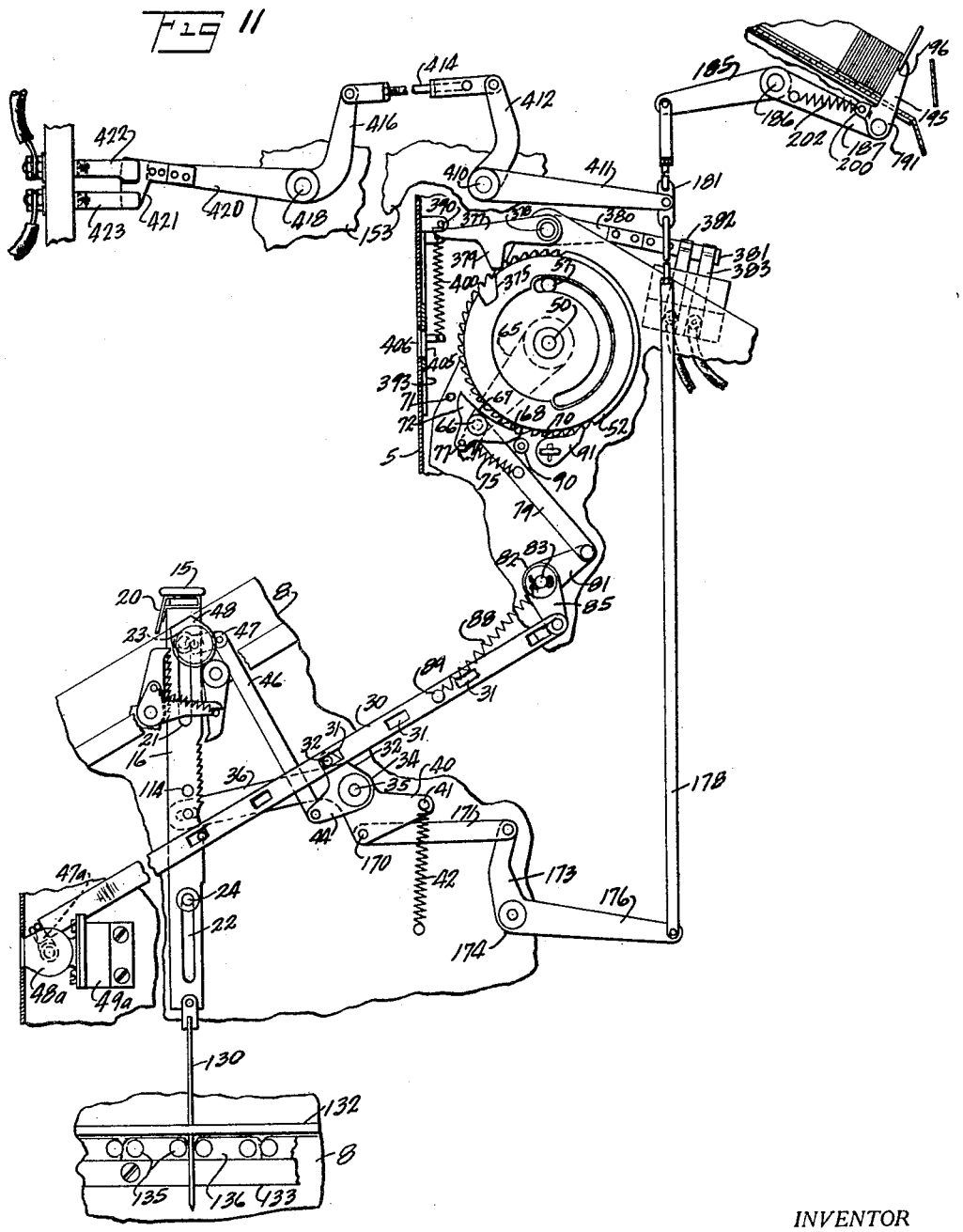
INVENTOR
H. R. Brand
BY
ATTORNEY Jan. 3, 1933.  H. R. BRAND  1,893,013
TOKEN DELIVERING MACHINE
Filed May 16, 1927   21 Sheets-Sheet 9
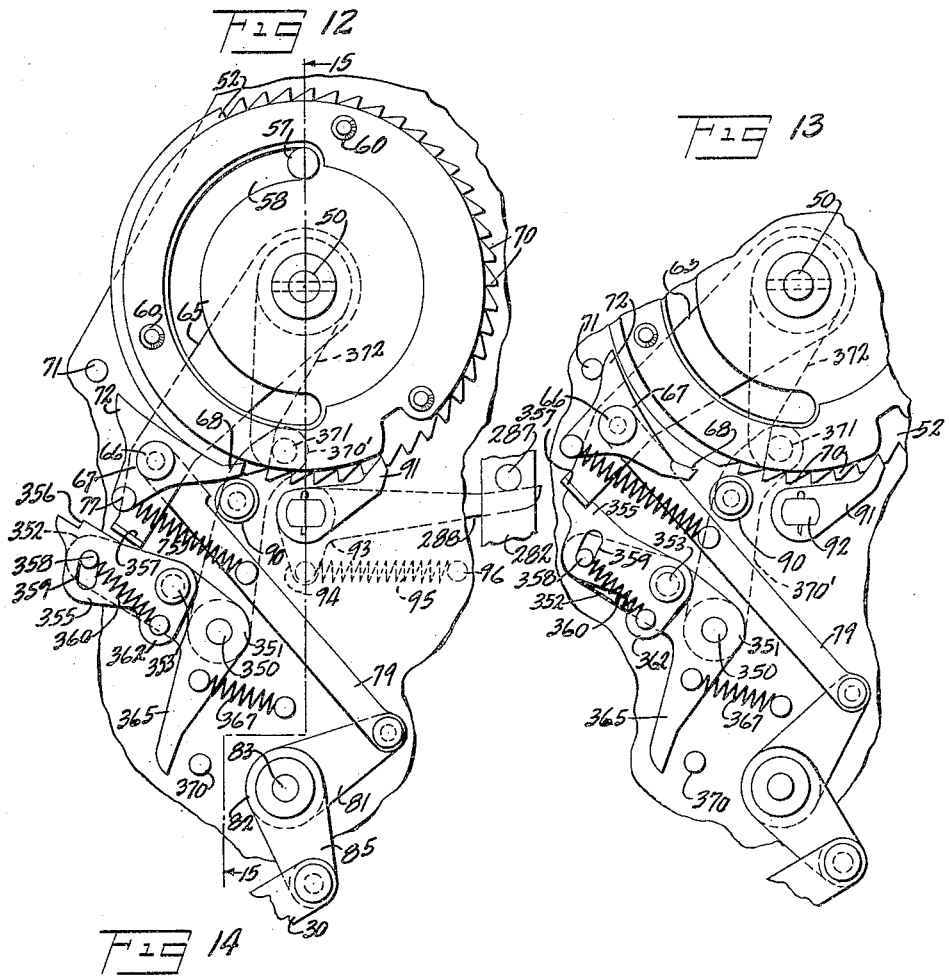
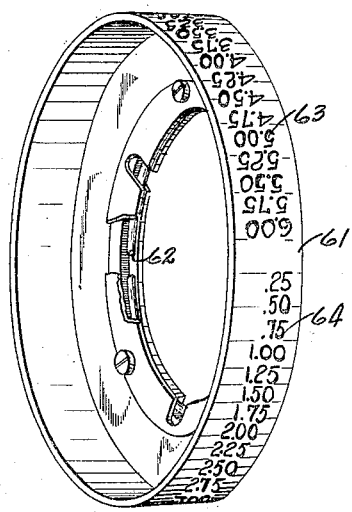
INVENTOR
H. R. Brand
BY
ATTORNEY

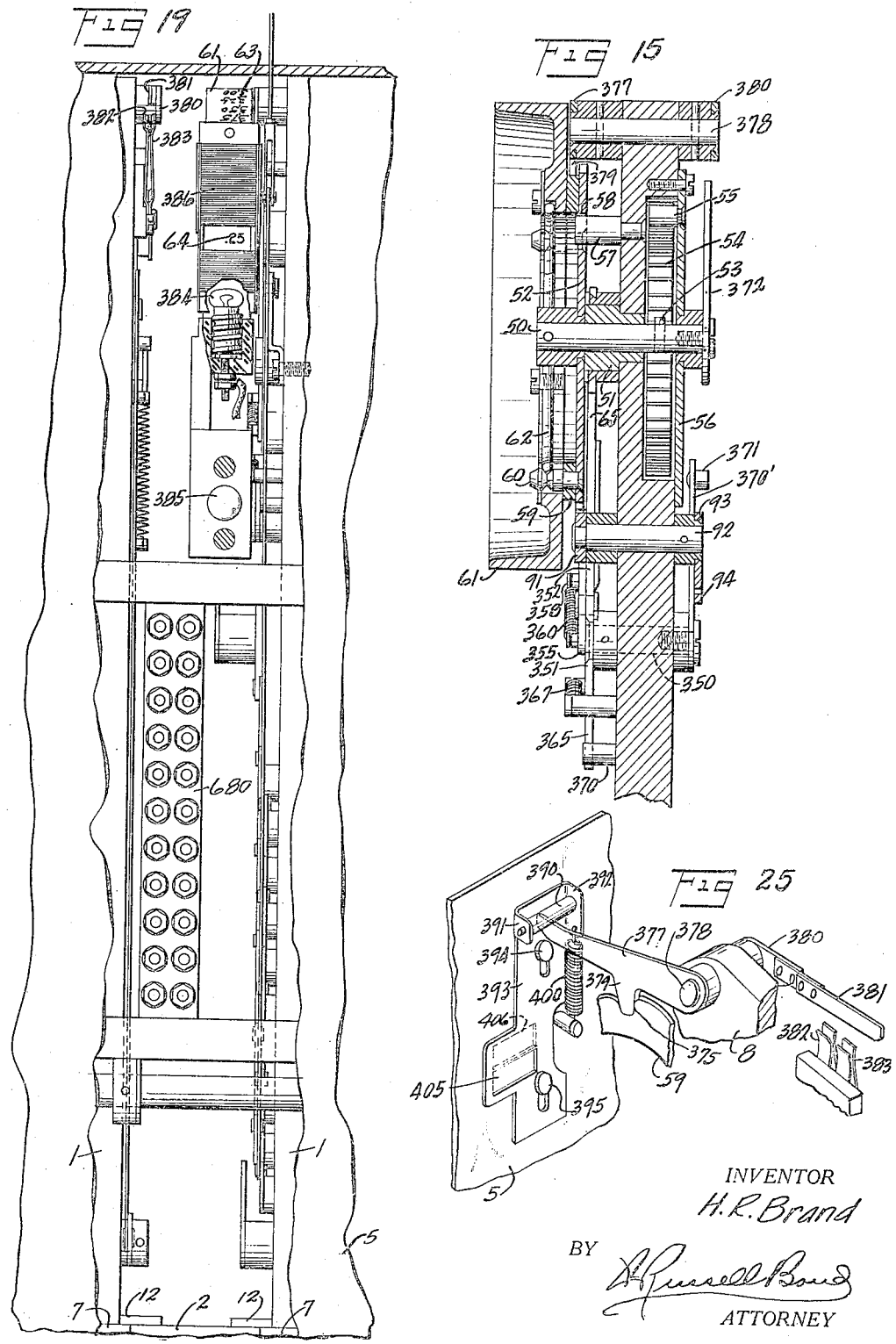

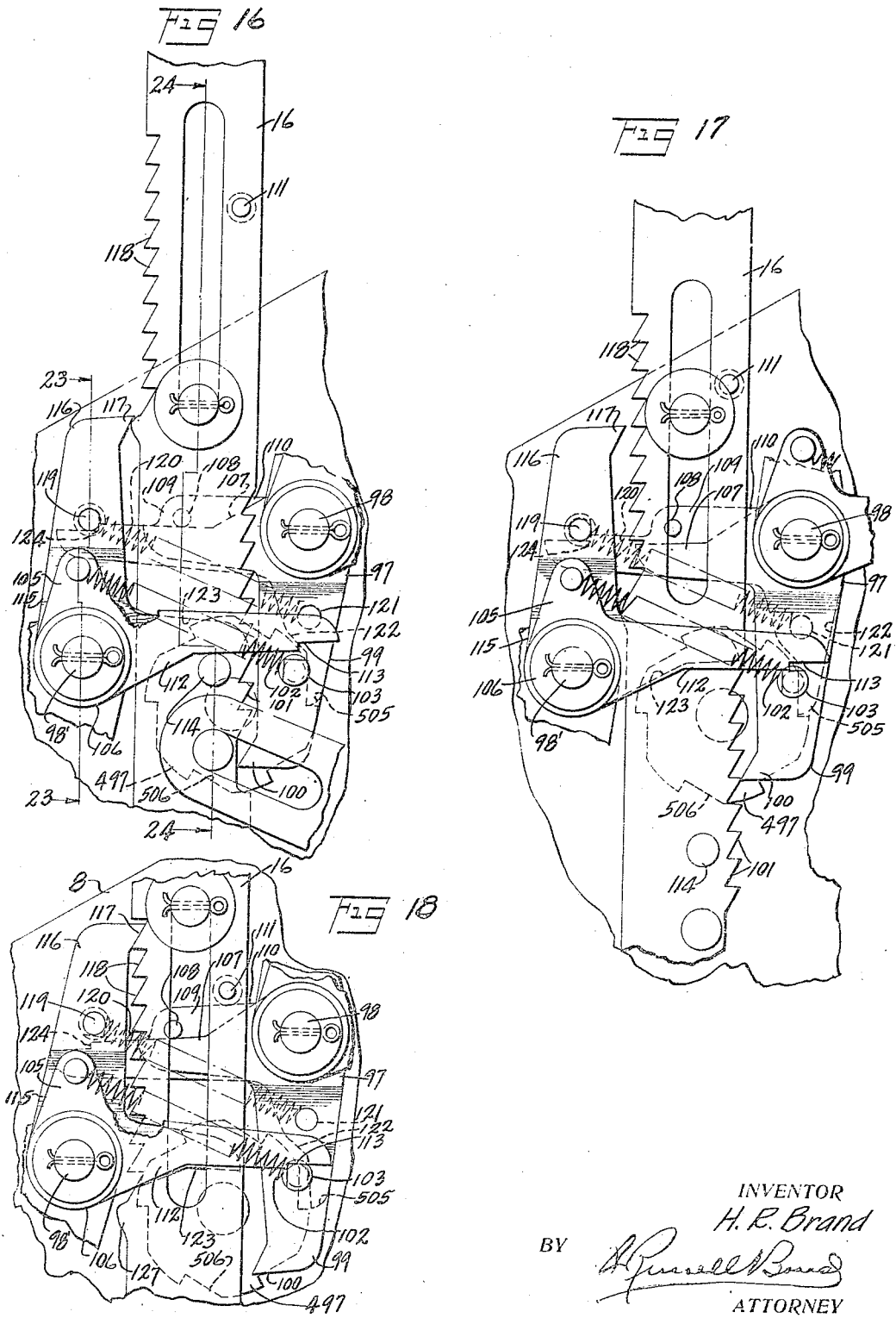

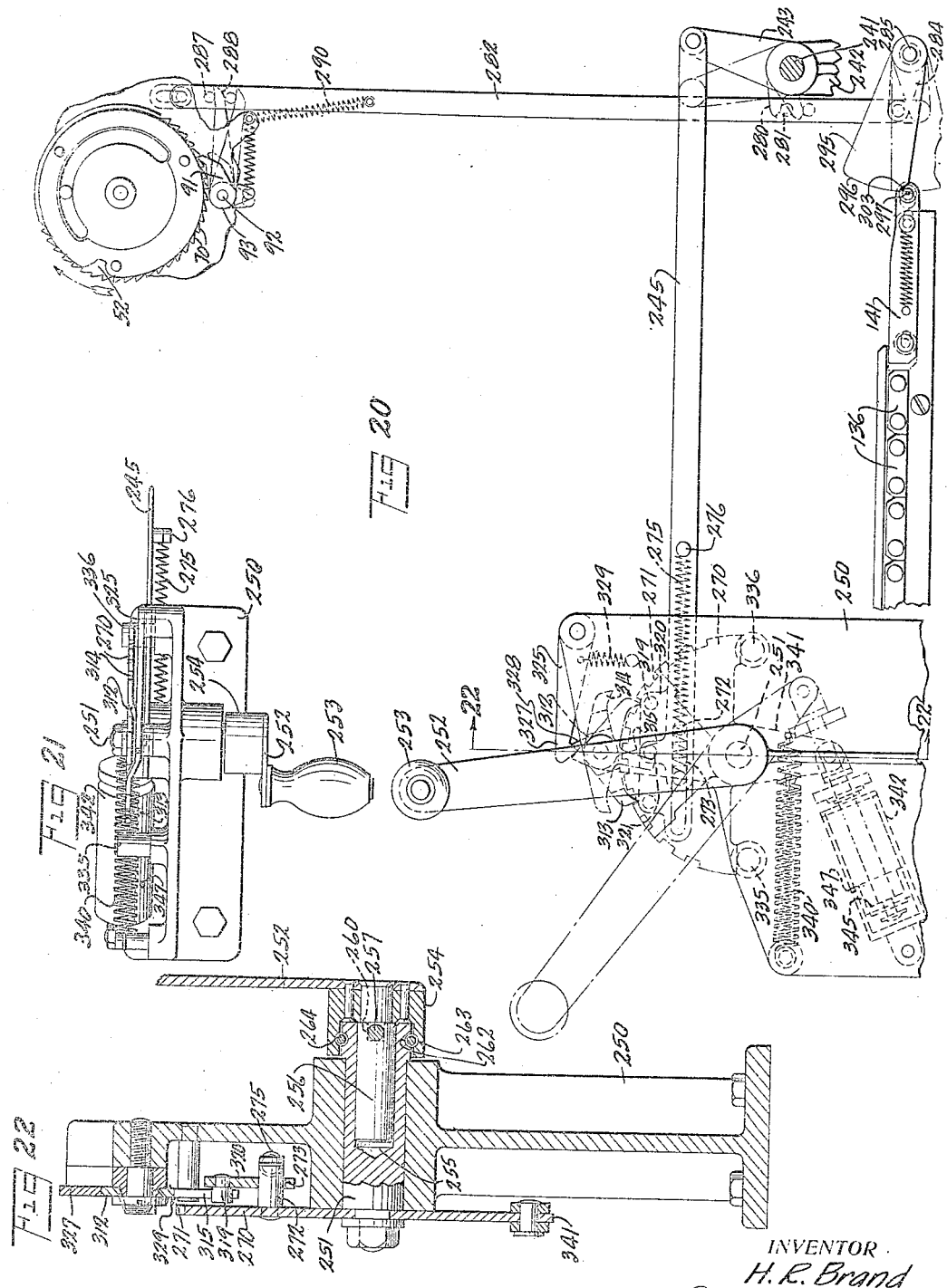

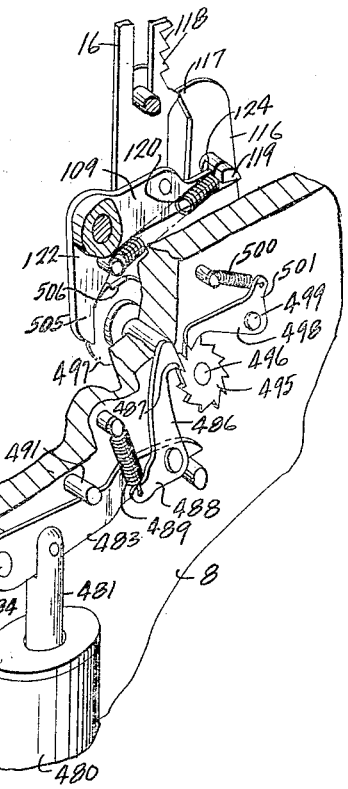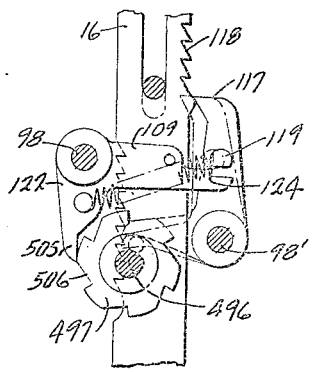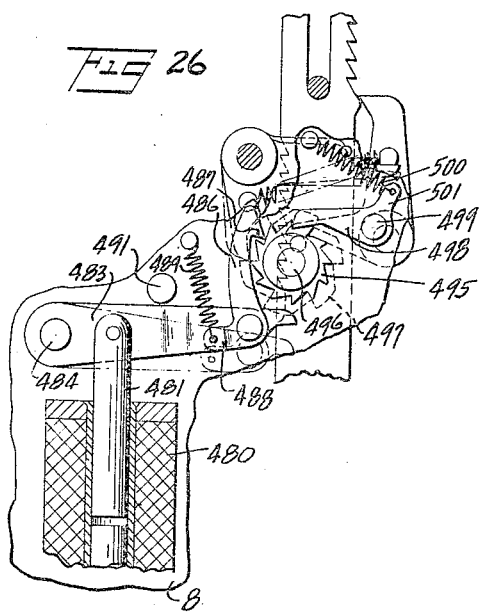

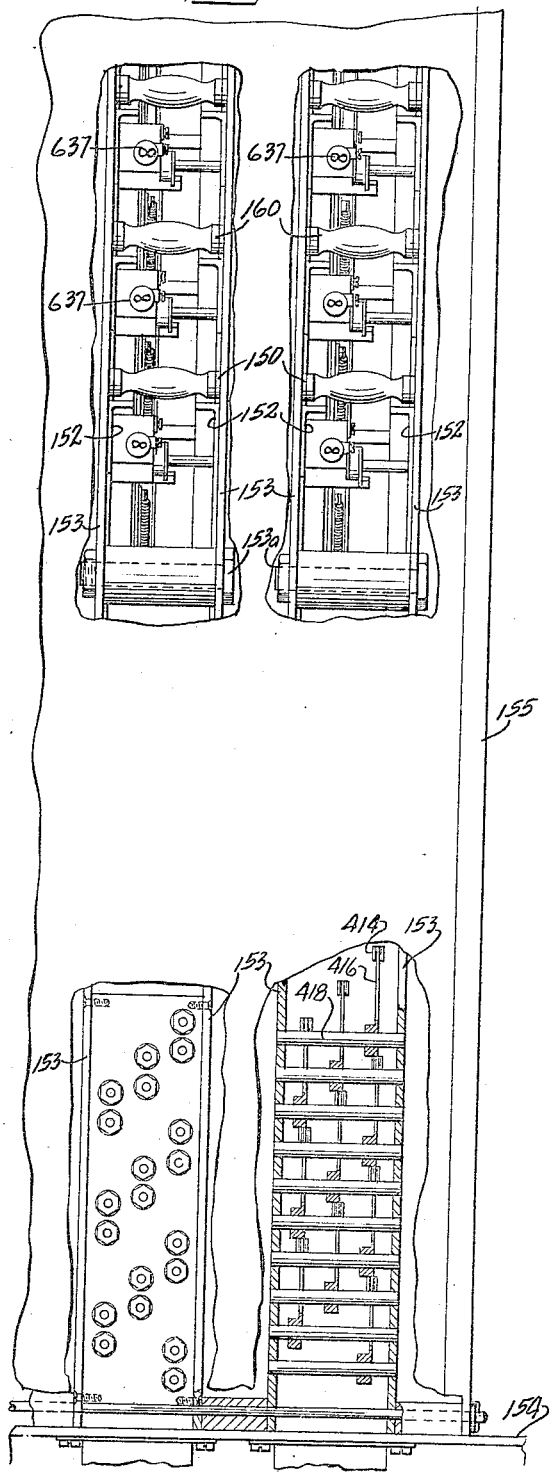

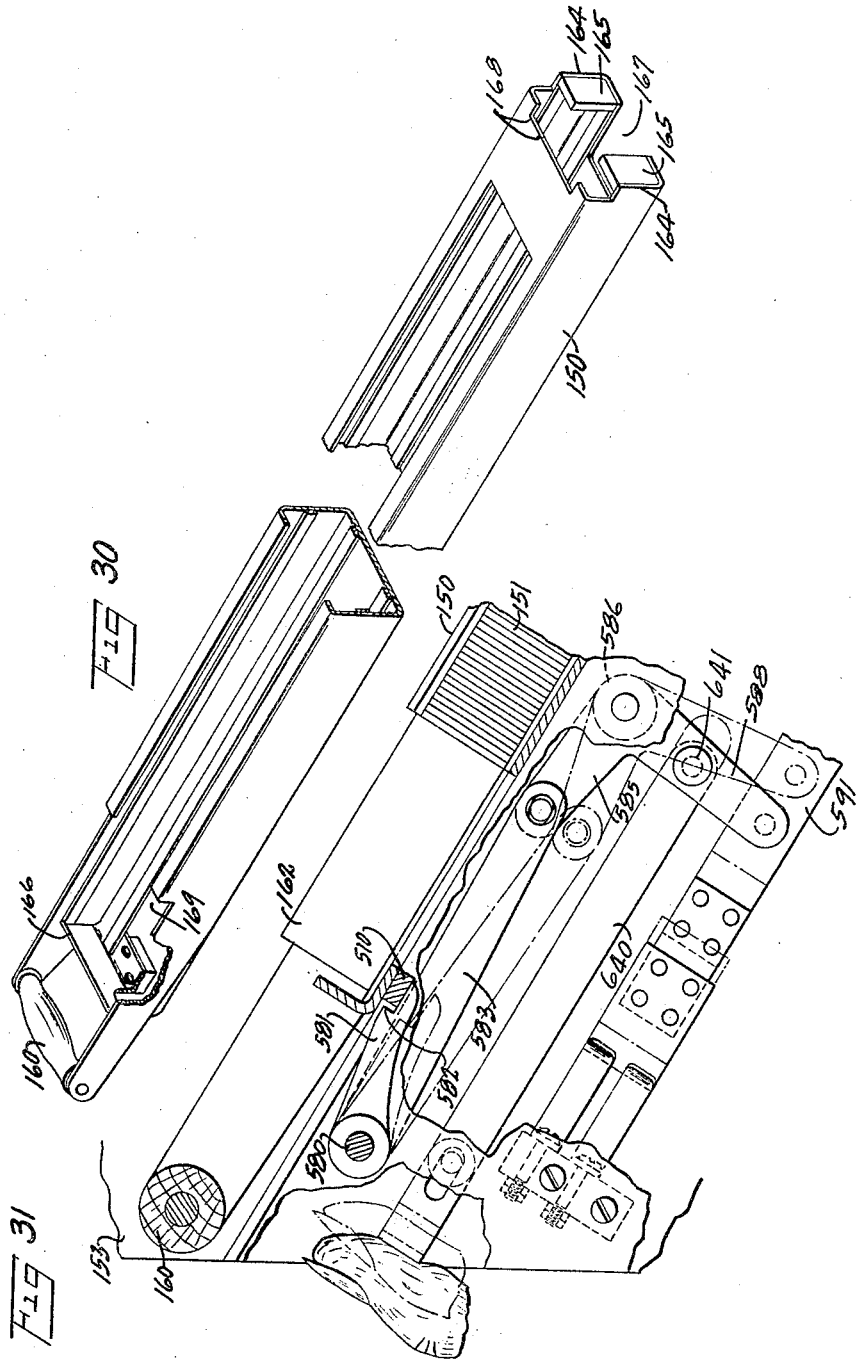

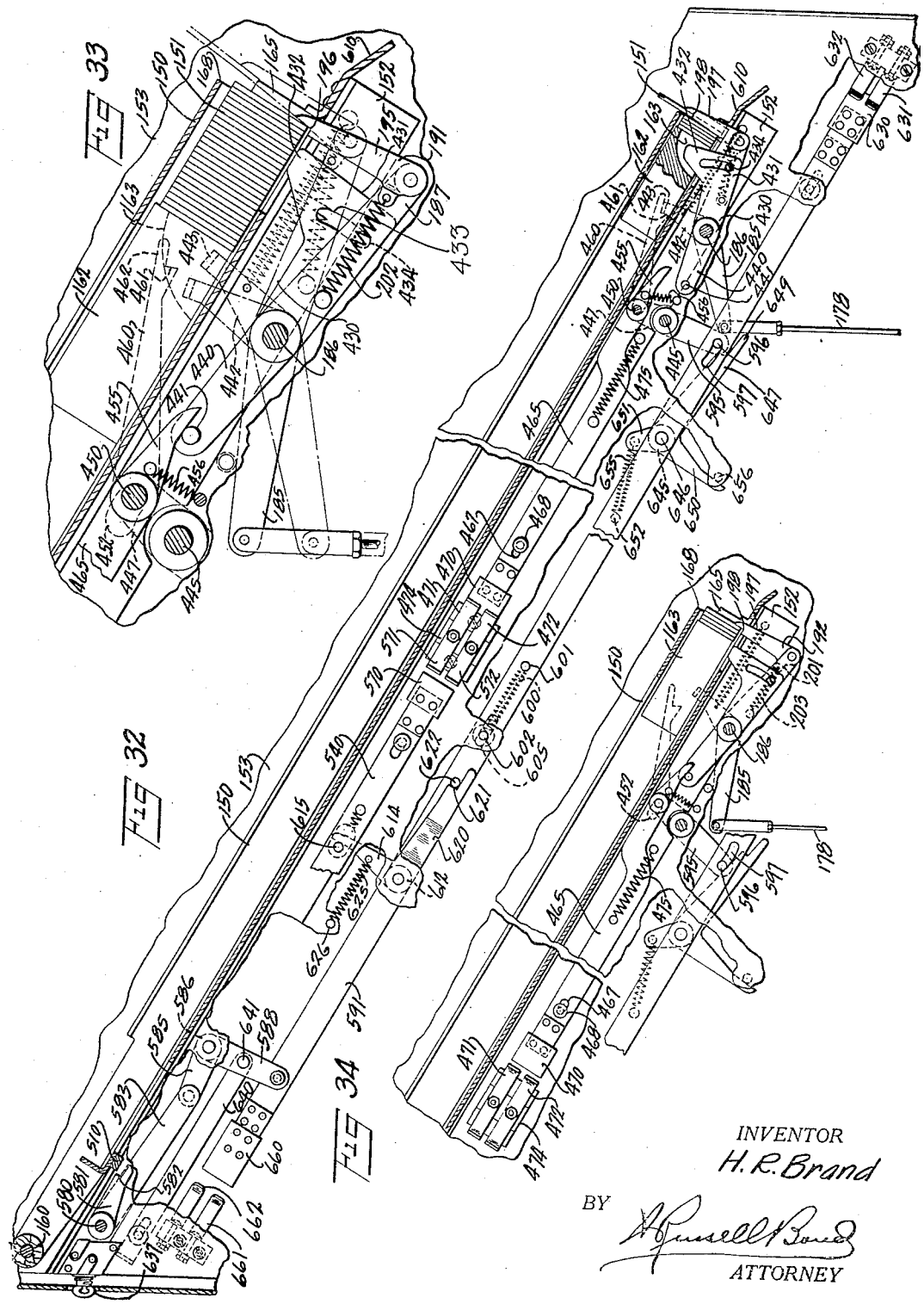

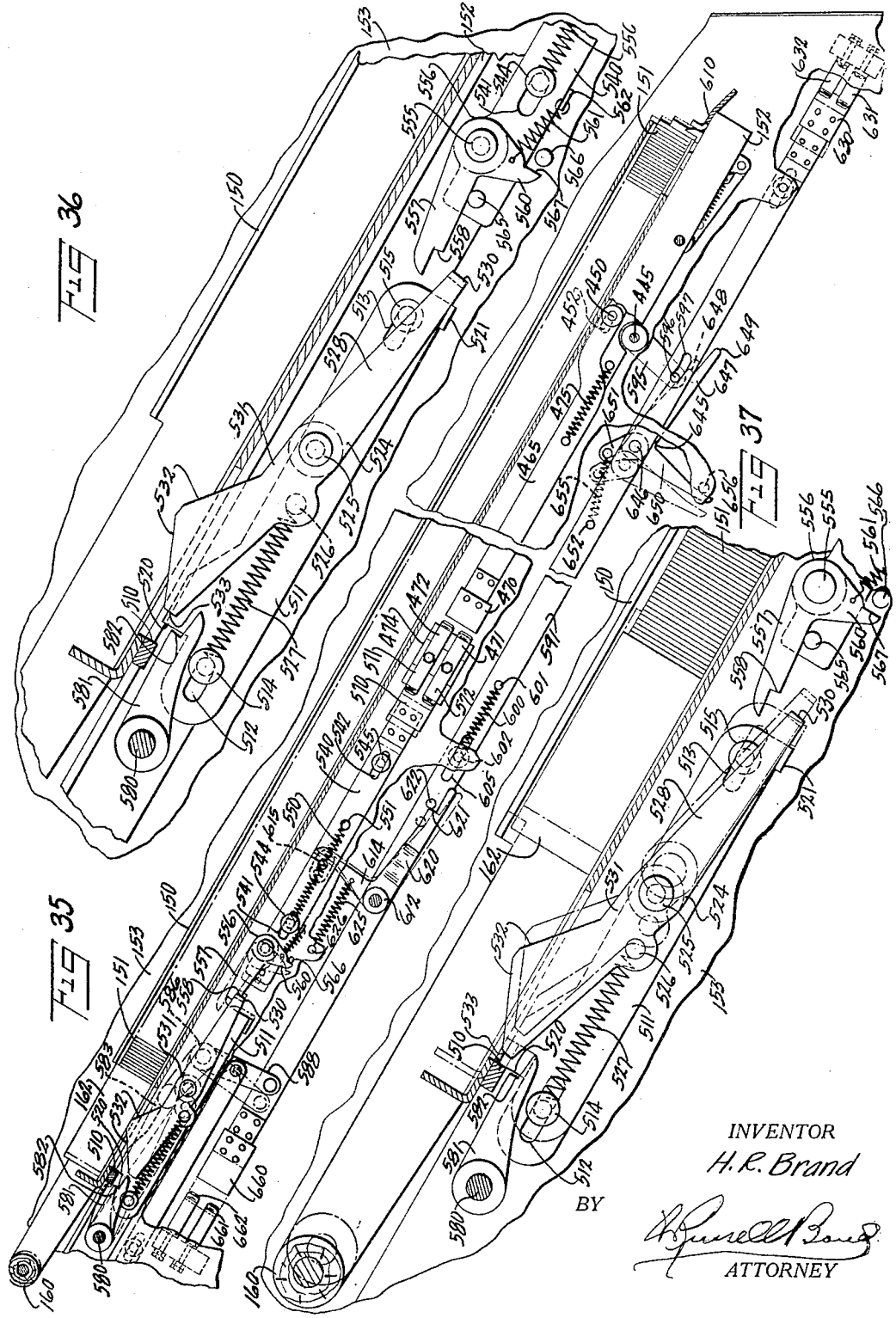

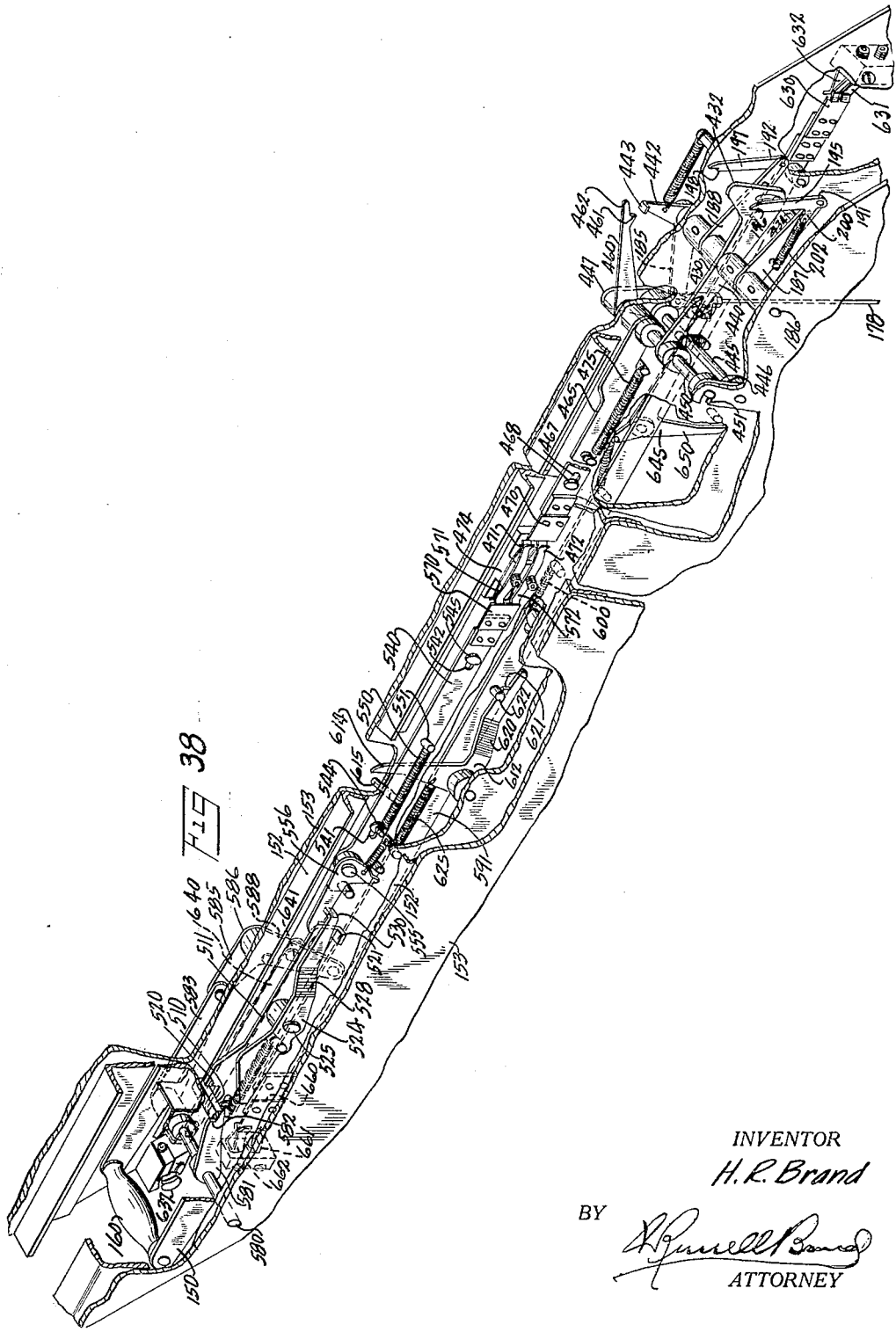

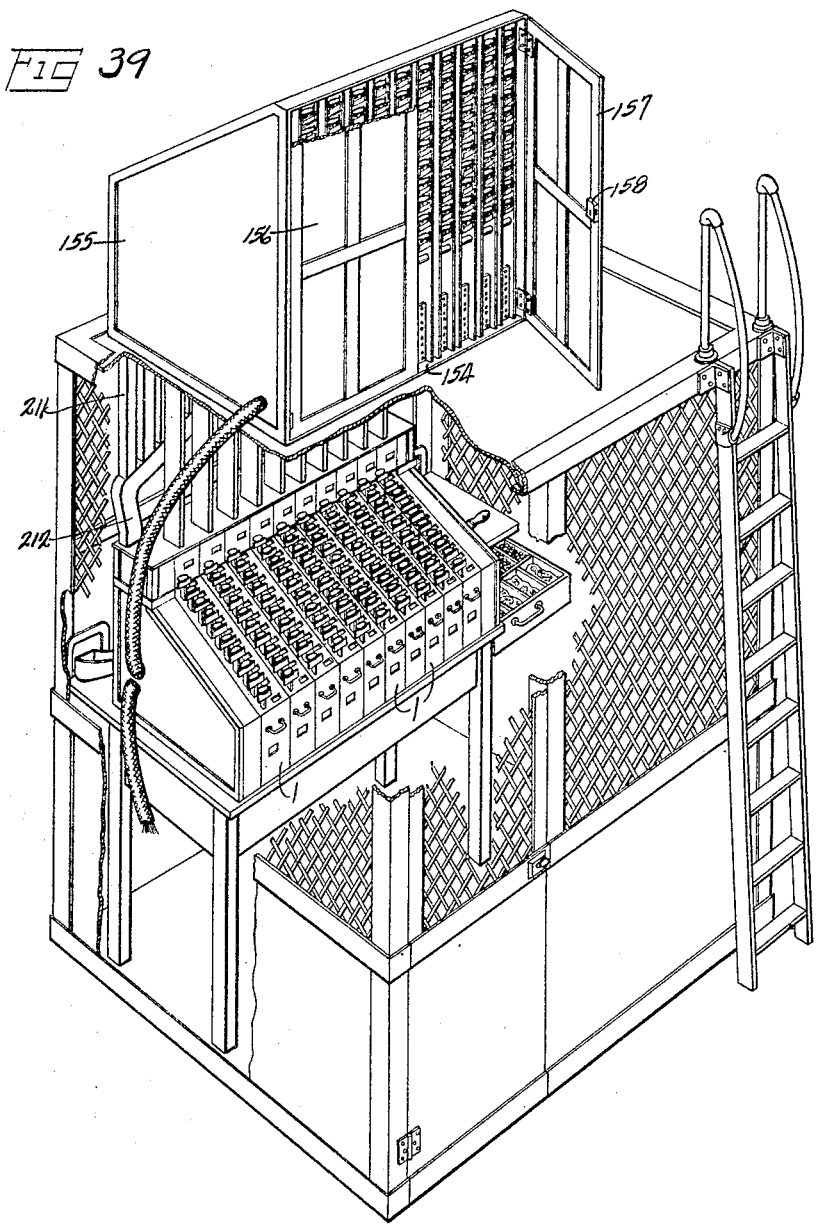

Jan. 3, 1933  H. R. BRAND  1,893,013
TOKEN DELIVERING MACHINE
Filed May 16, 1927  21 Sheets-Sheet 20
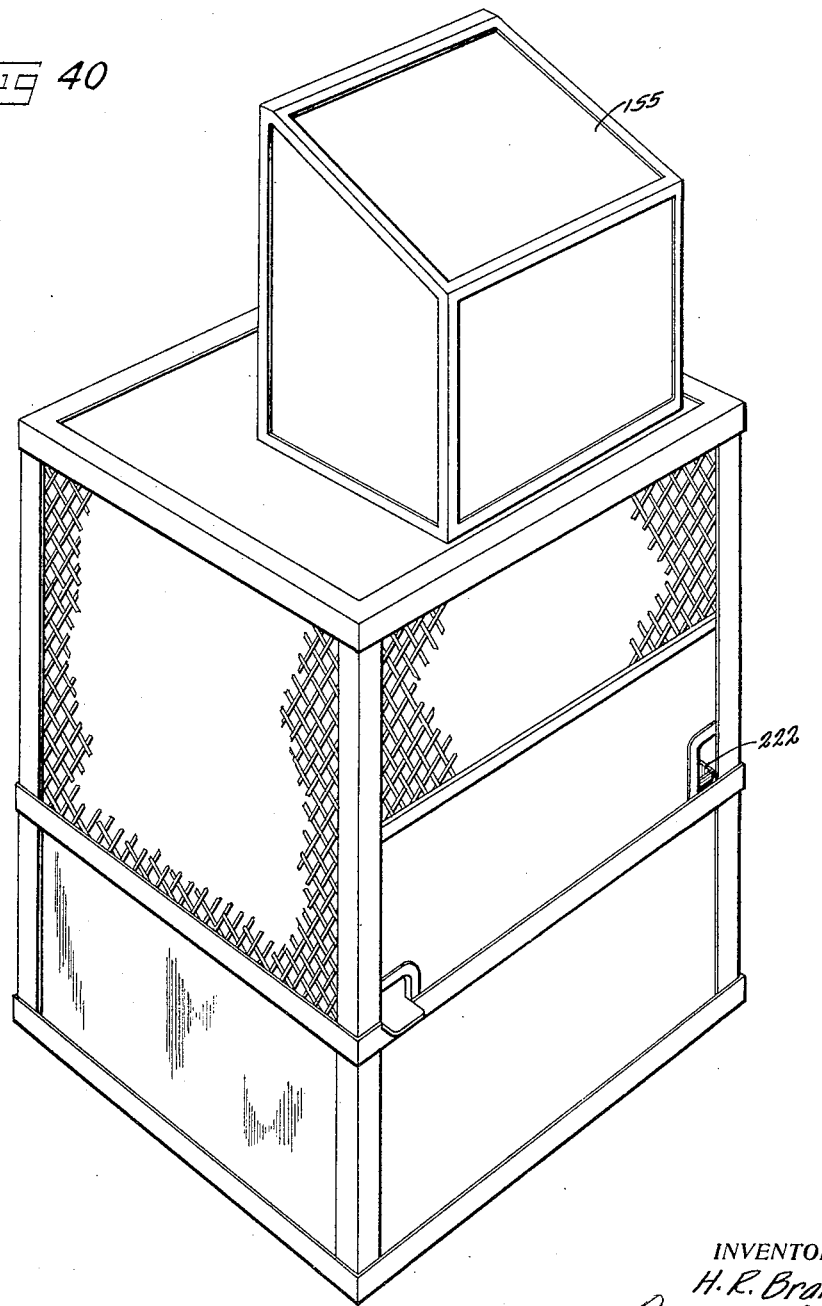
INVENTOR
H. R. Brand
BY
ATTORNEY Jan. 3, 1933. H. R. BRAND 1,893,013
TOKEN DELIVERING MACHINE
Filed May 16, 1927 21 Sheets-Sheet 21

INVENTOR
H. R. Brand
BY
ATTORNEY

Patented Jan. 3, 1933

1,893,013

UNITED STATES PATENT OFFICE

HARRY RUSSELL BRAND, OF NEW YORK, N. Y.

TOKEN DELIVERING MACHINE

Application filed May 16, 1927. Serial No. 191,205.

My invention relates to machines for delivering tokens and has for an object to provide a manually controlled token delivering machine adapted for use at an ordering station, such for instance, as a cashier's desk.

A specific object of my invention is to provide a machine whereby a cashier or other operative may issue commodity identifying tokens to a customer, for which tokens the customer may obtain the commodities identified thereby at another station.

Another object of my invention is to provide a machine which under control of an operator, will select tokens identifying commodities ordered by a customer and will indicate the sum that must be paid for such commodities, but will temporarily retain the tokens until they have been paid for by the customer whereupon the tokens will be released to the customer.

Another object of my invention is to provide means for automatically operating, as each token is released, a corresponding signal, annunciator, or other device at a remote point.

Another object is to provide an apparatus embodying the objects and features above described, which apparatus is composed of a series of separate, detachable, and readily replaceable units, so that in case of failure of one unit it may be replaced by a spare unit without delay.

Other objects and features of my invention will appear hereinafter in connection with the following description of a specific embodiment of my invention, and the scope of my invention will be clearly defined in the appended claims.

In the accompanying drawings,

Fig. 1 is a front elevation of my token delivering machine, from the viewpoint of the cashier, certain units being omitted and certain parts broken away;

Fig. 2 is a view in section taken on the line 2—2 of Fig. 1, showing one of the units with a side wall of the casing removed to illustrate interior operating mechanism;

Fig. 3 is a view in section taken on the line 3, 3 of Fig. 1 showing the other side of one of the units in position in the machine with a side wall of the casing of the unit removed;

Fig. 4 is a simplified front elevation of one of the units from the point of view of the cashier, the casing of the unit being removed;

Fig. 5 is a side elevation of the upper or magazine portion of the machine with the casing of the magazine removed and certain parts broken away;

Fig. 6 is a view in section taken on the line 6, 6 of Fig. 1, showing the token segregating and delivering mechanism;

Fig. 7 is a view in section taken on the line 7, 7 of Fig. 6;

Fig. 8 is a simplified fragmentary side elevation of the key actuated operating mechanism;

Figure 41:
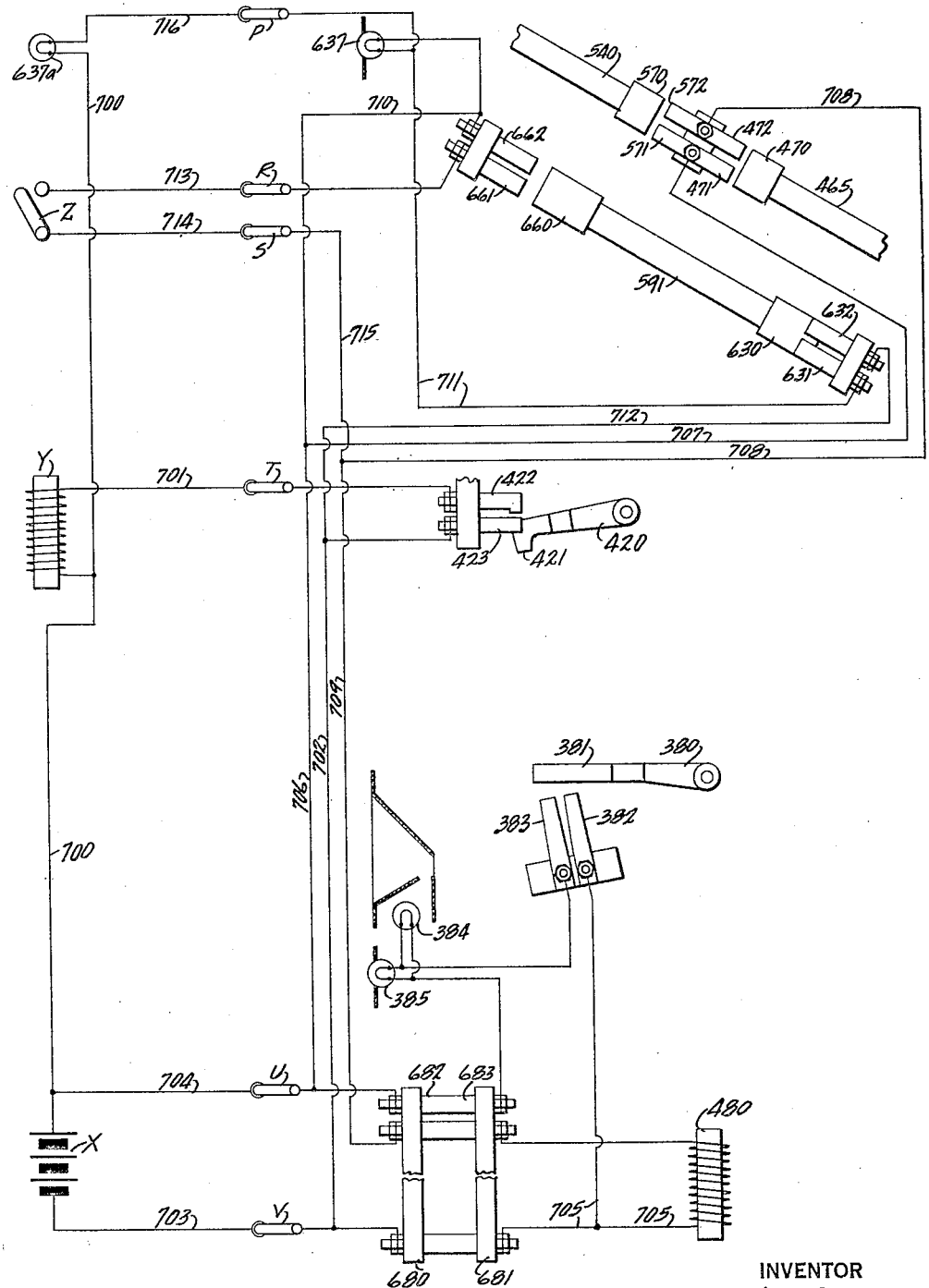

Figs. 9 and 10 are details of certain interlocking mechanism for preventing simultaneous operation of two keys in a unit; Fig. 9 being a section taken on the lines 9, 9 of Fig. 10 and Fig. 10 being a section taken on the lines 10—10 of Fig. 8;

Fig. 11 is a view similar to Fig. 8 showing the positions of various parts when a key is depressed;

Figs. 12 and 13 illustrate details of mechanism for accumulating the total sales, within a unit, to a customer;

Fig. 14 is a perspective view of an indicating drum arranged to exhibit the total sales of a unit simultaneously to the cashier and to the customer;

Fig. 15 is a view in section taken on the line 15—15 of Fig. 12; with the indicating drum in place;

Figs. 16, 17, and 18 are details of the mechanism for insuring a complete operation of the key in either direction before it is permitted to operate again in the other direction, the view showing different positions of the various parts;

Fig. 19 is a view from the rear of a fragment of the machine with the casing broken away to show certain details of the accumulator operating mechanism;

Fig. 20 is a simplified side elevation of the operating mechanism for releasing the purchaser's price accumulator;

Fig. 21 is a top plan view of a portion of the same;

Fig. 22 is a view in section taken on the line 22—22 of Fig. 20;

Figs. 23 and 24 are sectional views taken along the lines 23—23 and 24—24, respectively of Fig. 16;

Fig. 25 is a perspective view showing a detail of a slot closing mechanism.

Figs. 26, 27 and 28 are views showing details of a key interlocking mechanism, the last view being shown in perspective;

Fig. 29 is a fragmentary rear end elevation of the token magazine and associated switching mechanism, part of the casing of the magazine being broken away to illustrate interior details;

Fig. 30 is a perspective view of one of the removable token magazine drawers;

Fig. 31 is a side elevation of a portion of the token magazine, certain parts being broken away to illustrate certain control mechanism;

Figs. 32 to 37 inclusive are fragmentary views in longitudinal section of the token magazines and magazine controlling mechanisms in different positions;

Fig. 38 is a perspective view, partly broken away, of certain token control and token magazine control mechanisms;

Fig. 39 is a perspective view of a cashier's station partly broken away and showing a token delivering machine and magazine in assembled relation;

Fig. 40 is a perspective view of the cashier's cage as viewed from the customer's side; and Fig. 41 is a diagram of electric circuits used in my improved token delivering machine.

In general my machine comprises a token magazine and a keyboard portion associated therewith through a suitable mechanism whereby on depressing a key a corresponding token will be released from the magazine and on operating a suitable lever the token released will be delivered into a receptacle accessible to a customer.

The keyboard portion of the machine includes a plurality of units 1, enclosed in a casing which comprises a base 2, (Figs. 1, 2, 3, and 19) having attached thereto sides 3 and 4 (see particularly Fig. 1), and a back 5. A plurality of ways 6—6 are formed in the base 2, and adapted to slidably receive a plurality of plates 7 respectively each of which is fixed to the bottom of a frame 8 of one of the unit mechanisms 1. Guide plates 12, fast on the base 2, are suitably mounted to retain a plate 7 and hence the unit 1 in the way 6.

As embodied, selective means are provided for operating certain mechanisms within and more or less remotely placed relative to the unit. This means consists of keys 15 (Figs. 1, 2, 3, 8, and 11) fixed on the upper end of vertically sliding bars 16, 16 protruding from a plate 17, fixed to the frame 8. With all the units 1 in position in the machine, the plates 17 of the several units combine to form a front covering or casing wall for the keyboard portion of the machine. A bar 18 (see Fig. 1) is adapted to be detachably held by projections 19 on the sides 3 and 4 of the machine and is preferably locked thereto to prevent tampering with or withdrawal of any of the units, except by an authorized person.

Formed on each of the keys 15 is an escutcheon plate 20, adapted to visably carry a label 20a which preferably bears on its exposed face the name of the item represented by its carrying key and also the price of the item.

In the present illustration of the invention all the commodities represented in a unit 1 are of like value. For example, as shown in Fig. 1, the commodities represented in the unit positioned at the center of the machine are shown as of 25 cent value while the unit at the left thereof carries name plates showing items valued at 35 cents each. Obviously the units may differ in commodity values, one from the other, or two or more may represent the same values.

The key actuated mechanism being substantially the same for each key, a description of one key train will suffice. Each key includes a key bar 16 (see particularly Figs. 8 and 11) which has a slot 21 formed therein near its upper end and a similar slot 22 near its lower end. These slots engage studs 23 and 24 respectively in the frame 8 and thus provide guiding means for a limited vertical movement of the bar 16.

Means are provided for recording both the total number of each item ordered and the total number of all items ordered in a unit as represented by key depressions and, as embodied (Figs. 8 and 11), a bale 30 has slots 31—31, formed therein suitably disposed relative to each key bar 16 of the unit, there being one slot 31 for each of the key bars. Suitably embraced by each slot 31 is a pin 32 fixed in the free end of an upwardly projecting arm 33 of a bell crank 34 which is rotatably mounted on a stud 35 fixed in the frame 8. An arm 36 fast to the bell crank 34 has pin and slot connection at its free end with the bar 16. A two-prong arm 40, also fast to the bell crank 34, has connected thereto at one prong 41 a spring 42 under tension, the other end of the spring being fixed to the frame 8.

Depression of the key bar 16 will rotate the bell crank 34 and, through the cooperation of the pin 32 and the adjacent slot 31, will give a forward movement to the bale 30, that is, to the left as seen in Fig. 8, and to the position shown in Fig. 11. The spring 42 will return the key bar 16 through the connected mechanism to the initial position of rest. It will be understood that the slots 31, 31 are so shaped and of such length relative to the pin 32, that the actuation of the bale 30 by any key in the unit will not give movement to the bell cranks 34, 34 connected to those keys which are inactive.

An arm 44 of the bell crank 34 (see especially Figs. 2, 4, 8 and 11) is connected at its free end by a link 46 to an arm 47 of a counter 48 fast on a bracket 49, which is fixed to the frame 8, there being a counter 48 for each key 15. The dial of each counter is preferably visible through an aperture in the plate 17. Each unit is also provided with a single counter 48a having an operating arm 47a and mounted on a bracket 49a fixed to the frame 8. The free end of the arm 47a is connected to the forward end of the bale 30, so that the depression of a key will thus register on its own key counter 48 and will also register on the unit counter 48a. The dial of the counter 48a is visible through an aperture in the front plate of the casing. The counters or registers may be of any well known type and therefore need no detailed description.

Means are provided by the invention to indicate the cumulative values represented by the keys, there being a dial for each unit with successive characters indicating the accumulated total of the key depressions or orders placed. As embodied and shown particularly in Figs. 2, 12, 13 and 15, a shaft 50 in the upper portion of the unit is mounted in a bearing 51 in the frame 8 and has fast on one end thereof a toothed wheel 52. Near the opposite end of the shaft 50, (see especially Fig. 15) is a pin 53 to which is suitably attached one end of a clock spring 54 under tension, the opposed end being fastened to a stud 55 in a plate 56 fixed to the frame 8. The spring 54 is adapted to effect rotation of the shaft 50 and the toothed wheel 52 in one direction. A pin 57 (see also Fig. 12) is fixed in the frame 8 and is suitably placed to engage a slot 58 formed in the wheel 52, and limit rotation of the latter. Fig. 12 shows the relative position of the pin and slot when the wheel 52 has reached the limit of positive forward or counterclockwise movement against the spring 54 and Fig. 2 shows the wheel 52 at its opposite limit when it has been returned to its zero or non-registering normal position under impulse of the spring 54. On the face of the toothed wheel 52, (see particularly Fig. 15) is fixed a ring 59, by means of riveted studs 60. The protruding ends of studs 60 serve to detachably hold in a fixed angular position, a drum 61. A split ring 62 freely mounted on the drum 61 (see also Fig. 14) operatively engages the suitably shaped outer ends of the studs 60 thereby detachably fixing the drum 61 relative to the toothed wheel 52.

The peripheral face of the drum (see also Fig. 19) forms a dial on which are carried two sets of diametrically opposed characters 63 and 64, the characters of one set being reversed with respect to the characters of the other set so as to show the same reading when seen from the front and rear of the machine. The successive characters of each set represent progressively the accumulation of the values represented by successive key depressions of the unit.

Rotatably mounted on the bearing 51 (Figs. 8, 11, 12, 13, and 15) is an arm 65 which carries at its free end a stud 66. On the stud 66 is freely mounted a three-pronged member 67 operatively adjacent to the toothed wheel 52. A tooth 68, (see particularly Figs. 8, 11 and 12) is formed on the free end of one of the prongs of the member 67 and is adapted to engage the teeth 70 of the wheel 52 when the arm 67 is rotated about the stud 66. A pin 71 in the frame 8 coacts with a prong 72 of the member 67 and is adapted normally to maintain the tooth 68 disengaged from the teeth 70. A spring 75 under tension is connected at one end to a prong 77 of the member 67, the opposed end of the spring being attached to a link 79. One end of the link is freely mounted on the stud 66, the opposite end being connected to an arm 81 of a bell crank 82 mounted on a stud 83 in the frame 8. An arm 85 of the bell crank 82 (see Figs. 8, 11, and 12) is pivotally connected at its free end to the upper or rear end of the bale 30. A spring 88 under tension between a pin 89 fast in the bale 30 and the stud 83 tends both to maintain the prong 72 normally in contact with the pin 71 and to return the bale to its normal position of rest after its actuation by the depression of the key 15.

By referring to Fig. 11 it will be seen that the depression of a key will, through the above described connected mechanism, cause the tooth 68 to engage a tooth 70 and feed the dial 61 forward through an angular space of one tooth. In the machine illustrated in which all the keys of one unit represent commodities of like value, the successive characters 63 and 64 will differ by that value and the depression of the key will be made to cause the toothed wheel 52 to advance one notch and hence to advance the dial by a corresponding amount.

Means are provided to positively limit any forward movement of the dial and to detachably hold the dial in the new position which, as embodied, consists of a pin 90 (Figs. 8, 11, 12, and 13) fixed in the frame 8, and adapted to be operatively engaged by a suitably shaped face of the tooth 68 when said tooth carries the toothed wheel 52 forward as above described. It will be obvious that the pin 90 acts as a stop and at the same time wedges the teeth 68 and 70 together to prevent overthrow of the wheel 52 and the dial 61. For maintaining the dial in the advanced position (see particularly Figs. 2, 3, 12 and 15) a detent 91 is fixed in one end of a shaft 92 rotatively mounted in the frame 8. This detent is adapted to engage the teeth 70, 70. On the opposite end of the shaft 92 is secured a bell crank 93 having a depending arm 94 to the free end of which is attached one end of a tension spring 95, the opposed end of the spring being secured to the frame 8 at 96. The spring 95 tends to hold the detent 91 in engagement with the toothed wheel 52.

Means are provided to insure the complete movement of the key bars when actuated and the consequent complete operation of the connected mechanism hereinbefore and hereinafter described. In the embodiment of the invention (see Figs. 8, 11, 16, 17, 18, 23 and 24) a bell crank 97 is freely mounted on a stud 98 fast in the frame 8 adjacent to each key bar 16. A depending arm 99 of the bell crank 97 has at its free end a tooth 100 disposed cooperatively adjacent to the rear edge of the bar 16. A portion of this edge of the bar is formed with teeth 101 with which the tooth 100 is adapted to engage when desired. A spring 102 under tension is connected at one end to a pin 103 on the arm 99 and at the other to the free end of an arm 105 of a bell crank 106 mounted on a stud 98' fixed in the frame 8. As shown in Fig. 23 the studs 98 and 98' each carry two sets of bar cooperating parts, one set for the bar to the right and another set for the bar to the left. The spring 102 tends to cause the teeth 100 and 101 to engage when desired and Fig. 16 shows the tooth 100 in position to engage the teeth 101 on the depression of the key bar 16, the latter being shown in the normal position of rest. Fig. 17 shows the key bar in substantially its mid position on the downward stroke with the tooth 100 riding over a tooth 101, the spring 102 maintaining contact therebetween. The bell crank 97 has a forwardly projecting substantially horizontal arm 107 normally in contact with a pin 108 fixed in an arm 109 of a bell crank 110 freely mounted on the stud 98. The arm 109 lies in the path of a pin 111 fixed to and projecting from the key bar 16. As shown in Fig. 18 the key bar 16, as it approaches its lower limit of movement, carries the pin 111 into contact with the arm 109, the pin 108 acting on arm 107 causes the tooth 100 to disengage from tooth 101. The bell crank 106 has a substantially horizontal arm 112, projecting rearwardly. The free end of this arm has a notch 113 adapted to operatively engage the pin 103 in a manner to detachably maintain the disengagement of the teeth 100, 101, as above referred to. The spring 102 effects this latching when the arm 99 is rocked under the impulse of the pin 108. A pin 114 fast on the key bar 16 is adapted to engage the arm 112 when the key bar 16 is approaching its upward or normal position of rest causing a release of the notch 113 from the pin 103 and thus permitting the tooth 100 to again engage the rear edge of the key bar 16 for coaction on the next depression of the latter. It will be obvious from the foregoing that the key bar 16 must be fully depressed before it is permitted to return, thus insuring the complete functioning of the actuated parts prior to a re-depression.

Means are provided to prevent a re-depression of a key during its return or upward movement until it is near to its normal position of rest and, as embodied, consists of a bell crank 115, (Figs. 16, 17, 18, and 23), freely mounted on the stud 98' and having an upwardly projecting arm 116. A tooth 117 formed on the free end of the arm 116 is adapted to engage teeth 118 formed on the adjacent or forward edge of the key bar 16. Attached to a pin 119 fast in the arm 116 is one end of a spring 120 under tension, the opposed end being fastened to pin 121 carried by a depending arm 122 of the bell crank 110. This spring tends to maintain the teeth 117 and 118 in operative engagement when desired. The bell crank 115 carries a rearwardly projecting substantially horizontal arm 123 adapted to be engaged by the pin 114 as the key bar 16 approaches its upward limit of movement, and to be rocked thereby, thus causing the disengagement of the teeth 117, and 118. The free end of the arm 109 has a notch 124 suitably formed therein and adapted to engage the pin 119, and detachably maintain the disengagement of the teeth 117 and 118 when desired. When the bellcrank 115 is rocked by the pin 114 the pin 119 is moved clear of the notch 124 so that the latter may freely pass into the path of the pin 119. However, the notch when engaged by the pin 119 holds the tooth 117 clear of the teeth 118.

Means are also provided to prevent the simultaneous depression of more than one key in a unit, although it is permissible simultaneously to press a plurality of keys of different units in the machine made up of a number of units. In the embodiment of the invention (Figs. 2, 4, 8, 9, 10 and 11) a depending blade 130 is fixed to the lower end of the key bar 16 and, as shown in Figs. 9 and 10, the free end of this blade is preferably bevelled and guided in a suitably shaped slot formed in a plate 132 fast on a block 133 fixed to the frame 8. The block 133 carries studs 135 on which are freely mounted slides 136, 136, a single one of the latter being suitably disposed between the blades 130 of adjacent key bars 16 and adapted to be moved laterally thereby a desired distance when the key bar is depressed. A stop 140, (see especially Figs. 2 and 4) is fixed to the block 133 and is opposed to the forward end of the foremost slide 136, (i. e. the one at the extreme left in Fig. 2) and adapted both to limit the forward movement of the slides and to act as an abutment guide for the blade 130 of the lowest or foremost key bar 16. Suitably positioned relative to the rearmost slide 136 (i. e. the one at the extreme right in Fig. 2) is a stop bar 141 which has pin and slot engagement with the block 133 providing limited sliding movement of the stop bar. A spring 146 serves to maintain the bar 141 in fixed relation to the rearmost slide 136. It will be understood that a space 148 substantially equivalent to the thickness of a blade 130 represents the difference between the distance apart of the opposed faces of the stops 140 and 141, and the sum of the lengths of the slides 136. The upper corners of the slides are bevelled, as shown, to cooperate with the bevelled ends of the blades 130 so that when a key is depressed its blade 130 will wedge between and space apart the adjacent slides 136, 136 and force the remaining slides 136 against the stops 140, 141, thus preventing the downward movement of any other blade and its attached key. In the case of the foremost and rearmost keys of the unit the stops 140 and 141 respectively act as one abutting edge for the blades 130.

Means are also provided by the invention to cause the utterance of a corresponding identifying token upon the depression of a key. The tokens are stored in magazines, there being a magazine for each unit. Each magazine is provided with a plurality of drawers 150 (Figs. 5, and 29 to 38 inclusive) slidably retained therein, there being one drawer for each key of a unit containing tokens 151 corresponding to the key. The drawer 150 is supported on suitably inclined guides 152, (see particularly Figs. 5, 29, and 38) fixed to plates 153, 153. The latter are suitably spaced apart and held by studs 153a and are mounted on a plate 154 preferably above the main body or keyboard portion of the machine, as shown in Fig. 39. A casing 155 (Figs. 5, 33, 39, and 40) together with doors 156, 157 and the supporting plate 154 completely encases the magazine drawers. A lock 158 is provided for locking the doors and rendering the token magazines inaccessible except to an authorized agent. Each drawer is provided with a handle 160, (Fig. 38) in order to facilitate the withdrawal of the magazine for the purpose of reloading or for any other purpose. A removable weight 162 (see particularly Figs. 32, 33, 35 and 37) is adapted to slide freely within the drawer 150 and is placed in contact with the uppermost token 151. The weight 162 is formed on the under side thereof with a suitably shaped recess 163 adapted to cooperate with mechanism hereinafter described in the bottom of the drawer 150. The drawer 150, as shown best in Fig. 30, is preferably of channel shape with sides 164 and end plates 165, 165 at the lower end and a transverse plate 166 at the upper end. The lower end of the drawer has an opening 167 in the bottom wall thereof and a cross member 168 at the top. An opening 169 is provided near the upper or handle end of the drawer.

Referring now to the actuating mechanism for ejecting a token 151 (see Figs. 2, 8 and 11), at 170 on the arm 40 is freely mounted one end of a link 171 the opposite end of which is suitably connected to the free end of an arm 173 of a bell crank 174 rotatably mounted on the frame 8. An arm 176 of the bell crank 174 is connected at its free end by a connection 178 to an arm 185. The connection 178 is adjustable as to length and includes a link 181. The arm 185 is fixed to a shaft 186 rotatably mounted in the plates 153, 153 (see Figs. 33, 34 and 38). Also fixed to the shaft 186 are arms 187 and 188. On the free ends of these arms are rotatably mounted bell cranks 191 and 192 respectively. The bell crank 191 has an upwardly projecting arm 195 formed with the notch 196 in its free end and similarly the bell crank 192 has an arm 197 formed with a corresponding notch 198, the notches 196 and 198 being suitably in alinement. Arms 200 and 201 of the respective bell cranks 191 and 192 are connected by springs 202 and 203 under tension to pins fast in the arms 187 and 188 respectively. The arms 195 and 197 are suitably placed relatively to the end plates 165, 165 of the magazine drawer 150 and adapted to be in desirable operable contact with the lowermost token 151 in the drawer. The notches 196 and 198 are preferably of a depth less than the thickness of a token, and the distance between the inner face of the drawer ends 165, 165 and the outer edge of the cross member 168 is slightly greater than the thickness of a token. The normal position of the arms 195, 197 with the notches 196 and 198 beneath the outermost token and maintained in contact therewith by the springs 202 and 203, is best seen in Fig. 33. The depression of a key through the mechanism just described will rock the shaft 186 moving the arms 195 and 197 upward and with them the contacting token as shown in full lines in Figs. 11 and 32 and by broken lines in Fig. 33. Thus a token is ejected for each key operated. The cross member 168 prevents the ejection of more than one token actuated.

As shown in Fig. 5 a space 210 is provided between the lower end of the magazine drawer 150 and the magazine casing in each of the magazine compartments to provide egress of the ejected tokens. This space 210 converges at its lower extremity into a chute 211 (see also Figs. 1, 6, 7, and 39) which opens into a common inclined passageway 212. At the lower end of the passageway 212 there is a container 213 (see particularly Figs. 6 and 7) which is provided with a movable bottom consisting of a wing plate 215. This wing plate is freely mounted on a rod 216 which is carried by the sides of the container 213. A spring 217 under tension maintains the wing plate in the position shown in Fig. 6 when desired. The lower portion of the container below is preferably sharply curved and formed with an open mouth 221 suitably positioned relative to a cup-like receptacle 222 (see also Fig. 40) fixed to the machine casing and adapted to finally receive the ejected tokens for removal by the customer as hereinafter described.

As previously stated it is desirable to hold the ejected tokens until a transaction is partially completed. An accumulation of tokens is shown in Fig. 6 resting on a plate 215 after their rejection by the key actions. Means are provided for swinging the winged plate 215 to discharge the accumulated tokens and as embodied by the invention, includes (Figs. 1, 6 and 7) a link 225 one end of which is freely attached to the plate 215 and the other to the free end of an arm 228 secured on one end of a rock shaft 229. The latter is mounted in a bracket 230 fixed on the base 2. Secured to the opposite end of the rock shaft 229 is a depending arm 231, the free end of which has pin and slot connection with one end of a link 237. The opposed end of the latter is pivotally connected to the free end of a depending arm 240 fixed on one end of a rock shaft 241. The latter is rotatively carried in the bracket 230 and a bracket 242 fixed on the base 2. Adjacent the latter bracket is an arm 243 fixed on the shaft 241. The free end of the arm 243 has pivotally mounted thereon one end of a connection 245, as shown particularly in Fig. 20.

A bracket 250 (see also Figs. 21 and 22) has rotatably mounted therein a rock shaft 251 one end of which carries the hub 254 of a lever 252, the lever being provided with a handle 253 for manual operation. The shaft 251 is formed with a bore 255 adapted to receive a stud 256 fast in the lever 252. A pin 257 is fixed transversely in the stud and coacts with the slot 260 in the shaft 251 so that the arm 252 may give rotation thereto when desired. The lever 252 is detachably maintained on the shaft 251 by means of opposed annular grooves 262 and 263 formed respectively in the shaft 251 and the hub 254, a spring ring 264 cooperating therewith.

Fast to the shaft 251 on the end opposed to the lever 252 is a segment 270 formed with peripheral notches 271. A pin 272 is fixed in the segment 270 and enters a slot 273 in the end of the connection 245. A spring 275 under tension is anchored at one end to the pin 272 and at the opposite end to a pin 276 in the connection 245, thereby maintaining contact between the pin 272 and the opposing end of the slot 273. With the lever 252 in the normal position of rest as shown by full lines in Fig. 20 the wing plate 215 obstructs the free passage of the ejected token 151 as shown in Fig. 6.

Referring again to Fig. 20 movement of the lever 252 by means of manual power applied at the handle 253 in an anticlockwise direction substantially to the position shown by the broken lines, will rock the shaft 241 in the same direction through the mechanism just described. The broken lines in Fig. 6 show the resulting positions of the arms 240 and 228 and the open position of the wing plate 215. In the cup 222 the freed and deposited tokens 151 are also shown by broken lines.

As previously referred to when an order for one or more commodities has been registered by the drum or drums 61 and the order is complete, it is desirable to restore the drum or drums 61 to the normal or zero position and it is convenient to do so at the time of the release of the tokens into the cup 222. Means are therefore provided to release the toothed wheel 52 and the connected drum 61 and as embodied (Figs. 2, 3, and 20) consists of an arm 280 fixed on the shaft 241 and adapted to actuate a connection 282 by operatively engaging a pin 281 fast therein intermediate of its length. The lower end of the connection 282 is pivotally connected to the free end of an arm 284 fast on the shaft 285 rotatably mounted in the frame 8. The upper end of the connection 282 has pin and slot engagement with the frame 8, the pin and slot cooperating to suitably guide the upper end of the connection 282. A pin 287 (see also Fig. 12) is fixed in the connection 282 operatively adjacent the free end of an arm 288 of the bell crank 93. The bell crank is fixed on the shaft 92 which carries the detent 91 as previously described. A spring 290 under tension anchored at opposite ends respectively to the connection 282 and the frame 8, tends to maintain the connection in its upward position as limited by the pin and slot connection above referred to. In this normal position of rest the pin 287 does not interfere with the desired action of the detent 91.

The movement of the arm 252 as previously described will cause the arm 280 to contact with the pin 281 and carry the connection 282 downward which action will, through cooperation of the pin 287 and arm 288, rock the shaft 92 and thus withdraw the detent 91 from engagement with the teeth 70 of the toothed wheel 52. Thus freed and under impulse of the spring 54 (see Fig. 15) the drum 61 is permitted to return to its normal zero position. As the shaft 285 is adapted to permit only the desired movement of the connection 282 the spring 275 will yield for a further desired movement of the arm 252.

Means are provided to prevent the registering of an item during the return movement of the drum and also to prevent the ejection of a token when the winged plate 215 is in open position. In the present embodiment of the invention such means (as particularly shown in Figs. 2 and 20) consists of a sector 295 fast in the hub of the arm 284 and having its peripheral surface 296 operatively placed relative to a stud 297 fixed in the adjacent or rear end of the stop bar 141. The sector 295 is preferably bevelled at 303 to present a cam surface to the stud 297. The anticlockwise partial rotation of the shaft 285 as given by the like movement of the lever 252 will cause the sector to carry the slide stop 141 forward to the desired position, locking the slides 136, between the stops 140 and 141 and thus preventing depression of any key 15.

Means are also provided by this invention to insure the desired movement of the lever 252 in order that the proper functions may be performed thereby and to insure its returning to the normal position of rest. As embodied (see especially Figs. 20, 21, and 22) there is freely mounted on the bracket 250 a double ended pawl 312. The free end 313 of the pawl 312 is suitably shaped for engagement with the notches 271 of the segment 270, when the lever 252 is moved in one direction, and the free end 314 of the said pawl is suitably shaped for similar engagement with the notches 271 on the reverse movement of the arm 252. A depending arm 315 of the pawl 312 is adapted to be operatively engaged on one edge by a pin 319 fixed in a lug 320 on the connection 245, and on the opposed edge by a pin 321 also fixed in the lug 320. An arm 325 is freely mounted on the bracket 250, its free end 327 being doubly bevelled and adapted for coaction with a tooth 328 upwardly projecting from the pawl 312. A spring 329 under tension between the arm 325 and a pin fast in the bracket 250 is adapted to maintain the desired coaction between the bevelled face 327 and the tooth 328. Pins 335 and 336 are fixed in the bracket 250 and serve as stops for the sector 270 in its two extreme positions. A spring 340 under tension between a depending arm 341 fast on the shaft 251 and a pin fixed in the bracket 250 is adapted to return the lever 252 to its normal position.

The operation of the above described mechanism is as follows:

When the lever 252 is in its normal position of rest, as indicated by full lines in Fig. 20, the tooth 313 of a pawl 312 engages a notch 271 of the sector 270 and the rear or righthand face of the tooth 328 is engaged by the opposed face of the bevelled end 327 of the arm 325, the spring 329 cooperating to flexibly maintain this coaction. Movement of the lever 252 in an anticlockwise direction continues the engagement of the sector 270 by the tooth 313 notch by notch. Obviously the sector 270 is locked against retroaction until, at the end of the forward movement the pin 319 engages the depending arm 315 and further movement of the lever carries the tooth 313 out of engagement with the sector 270, and the tooth 314 into engagement therewith, with the arm 325 now engaging the forward or lefthand face of the tooth 328 and thereby aiding in and maintaining this condition. On the return stroke of the lever 252 the tooth 314 is in engagement and obviously prevents a change of direction in the movement. As the lever 252 nears its position of rest, the pin 321 engages the opposed face of the arm 315 and the tooth 314 is disengaged from the sector 270, the arm 325 again coacting. The tooth 313 is thus reengaged with a notch 271 and the movement of the lever 252 may be repeated.

Means are provided for the easy return of the lever 252 under the action of the spring 340. These means consist of a suitably constructed air cylinder 342 pivotally mounted on the bracket 250, and a cooperating piston 345 having its free end attached to free end of the arm 341. This device permits the operator to let the arm 252 return under impulse of the spring 340, a suitably positioned air port, 347, allowing slow egress of air.

Means are provided for locking the mechanism to prevent key depressions in a unit after the registering drum 61 has accumulated the desired capacity. As embodied (see particularly Figs. 2, 12, 13 and 15) there is fixed on one end of a shaft 350 rotatably mounted in the frame 8 a bell crank lever 351, one arm 352 of which has a stud 353 fixed thereto. An arm 355 mounted to turn on the stud 353 has a notched portion 356 adapted to operatively engage, when desired, a suitably shaped projection 357 formed on the free end of the arm 65. A pin 358 in the arm 352 is adapted to coact with a slot 359 in the arm 355 to desirably limit the rotation of the arm 355 about the stud 353. A spring 360 under tension between the pin 358 and a depending lug 362 of the arm 355 serves normally to press the notched end of the arm 355 upward into the path of the arm 65. The bell crank lever 351 has a depending arm 365 to which is attached one end of a tension spring 367, the other end being fixed in the frame, and the free end of the arm 365 is suitably placed relative to a stop 370 in the frame 8 against which the arm is normally drawn by action of the spring 367, as seen in Fig. 2. In this position the notch 356 is drawn clear the path of the projection 357. Fast on the end of the rock shaft 350 (see also Fig. 3), opposed to that carrying the bell crank 351, is an arm 370' in the free end of which is fixed a pin 371 operatively placed relative to the free end of an arm 372 fast on the shaft 50.

The operation of the mechanism just described is as follows:

During the key stroke which feeds the wheel 52 to its final position with the end of the slot 58 in contact with the pin 57 which acts as a stop, the arm 372 engages the pin 371, thus locking the arm 370' to the position shown in Figs. 12 and 13. As best seen in Fig. 12 the arm 355 engages the projection 357, the former yielding and partially rotating against the tension of the spring 360. On the return of the arm 65 to its initial position (see Fig. 13) during retrograde movement of the key bar 16, the projection 357 is engaged by the notch 356, the spring 360 driving the arm 355 into the desired operative position. The arm 65 thus being locked in its initial position by coaction of its projection 357 and the notch 356, it is obvious that the key 16 will also be locked through the connecting mechanism shown in Fig. 2, and any further depression will be impossible until the projection 357 and the notch 356 are disengaged. The release of the detent 91 as hereinbefore described permits the return of the wheel 52 under impulse of the spring 54, the arm 372 returning therewith, and under the action of the spring 367, the notch 356, and the projection 357 are disengaged and the wheel 52 is thus freed to be fed forward again when desired.

Means are provided to quickly indicate those dials which have registered the orders placed in the machine. As embodied in Figs. 2, 8, 11, 15, and 25, a depression 375 is formed in the periphery of the ring 59 fast on the wheel 52 and an arm 377 is fixed on a shaft 378 rotatably mounted in the frame 8. The arm 377 is formed with a depending lug 379 operatively placed relative to the depression 375 so as to engage therewith when the drum 61 is in its initial or zero position. Fixed on the opposite end of the shaft 378 is an arm 380, the free end of which carries a blade 381 preferably insulated therefrom and suitably placed for desired cooperation with terminals 382 and 383 in the circuit of a lamp 384 (see Figs. 2, 3, 19, and 41) and a lamp 385. An aperture 386 preferably covered with a pane of glass 387 is formed in the casing 5 and is adapted to permit a view of a single line of characters 64 on the drum 61. The free end of the arm 377 (see especially Fig. 25) is engaged by a pin 390 the opposed ends of which are carried by ears 391 and 392 formed in a slide 393. The latter is formed with slots engaged by shouldered pins 394 and 395 fixed in the casing wall 5 of the unit and thereby providing limited reciprocal movement of the slide. A spring 400 under tension serves normally to hold the slide in its lowermost position as shown in Fig. 25. The slide 393 has an aperture 405 therein desirably placed relative to an opening 406 formed in the adjacent casing wall 5 of the unit. The opening 406 is desirably located relative to the characters on the drum 61 so that when the slide is depressed as shown in Figs. 8 and 25 the aperture 405 and the opening 406 are not coincident. It will be understood that the opening 406 and the peripheral surface of the drum 61 are so related as to permit a view of only a single line of the characters 63.

The operation of the mechanism just described is as follows: The initial feed of the wheel 52 as affected by key depression raises the arm 377, the lug 379 resting on the periphery of the ring 59 and so remaining for each advance of the drum. This action throws the blade 381 into the terminals 382, 383, thus closing the circuit of the lamps 384 and 385 and lighting said lamps. The slide 393 is raised by the upward movement of the arm 377 bringing the aperture 405 into registry with the opening 406 and exposing to view the characters on the drum brought into alinement therewith. The lamp 385 indicates the unit on whose drum a value appears and the lamp 384 makes visible the character 64 brought into view. Thus the value on the drum is made visible to the operator on one side of the machine and to the customer on the other.

The token delivering machine is arranged to actuate a registering annunciator on a remote station or to initiate the operation of an automatic machine. Connected with each key is an actuating mechanism as shown particularly in Figs. 5, 8 and 11 which is as follows: Shafts 410, 410 are freely mounted on the plates 153, 153 operatively placed preferably below the lower end of each magazine drawer of a unit. On each shaft 410 is fixed an arm 411 connected at its free end to the link 181 of a connection 178. Each shaft 410 also carries an arm 412 fixed thereto. The free end of the arm 412 is connected by an adjustable link 414 to the free end of an arm 416 (see also Fig. 29) fixed to a rock shaft 418 rotatably mounted in the plates 153, 153. An arm 420 is also fixed to the shaft 418 and carries at its free end a blade 421 preferably insulated therefrom, and adapted to make contact with terminals 422 and 423 of a circuit including an operating magnet "Y" (see Fig. 41) or other electrical device at a remote station. Hence the depression of the key 15 in addition to registering its performance within the machine will also actuate a corresponding signal or other electrical device at a conveniently remote point.

Means are provided for locking the actuating mechanism when the tokens in the magazine are nearing depletion in order that recordation may be prevented unless a token is available for ejection. A lever 430 (see Figs. 32, 33 and 38) is freely mounted on the shaft 186. One arm 431 of this lever has an upwardly extending part 432 adapted to be engaged when desired, by the lower edge of the tokens 151 and to cooperate with the recess 163 in the weight 162. The free end of the lever 431 has a slot 433 formed therein which embraces a rod 434 carried by the arms 187 and 188 and so positioned that with the arms 187 and 188 in their normal position at rest, the part 432 is clear of the tokens 151. The lever 430 has a forwardly extending arm 440 which carries at its free end a pin 441. Also carried by the shaft 186 is an upwardly extending arm 442 fixed thereon and having a bent portion 443 at its free end. A rockshaft 445 freely mounted in the plates 153, 153 has fixed thereto near its opposed ends arms 446 and 447, which arms at their free ends provide bearings in which is rotatably mounted a shaft 450. Slots 451 and 452 in the plates 153, 153 embrace the shaft 450 in a manner to permit desired freedom but to form an abutment for the shaft in one direction as hereinafter described. Fast to the shaft 450 is an arm 455, the free end of which is operatively adjacent to the pin 441. A spring 456 tends to rock the arm 455 downwardly, pressing the part 432 of lever 430 upwardly. Also fixed on a shaft 450 is an arm 460 having its free end formed with a shoulder 461 and an outwardly projecting prong 462, both of which are operatively disposed relative to the projection 443. A slide 465, (Figs 32, 34, and 38) has one end freely mounted on the shaft 450 and is guided at the opposed end by means of a slot 467 therein, freely embracing a stud 468 fixed in the plate 153. The forward end of the slide 465, adjacent to the stud 468, has fixed thereto and preferably insulated therefrom, a blade 470 desirably placed relative to switch terminals 471 and 472. This blade is adapted to electrically engage the terminals 471 and 472 closing a circuit for a purpose hereinafter described. The terminals are preferably mounted on an insulated block 474 fast on one of the plates 153. A tension spring 475 anchored at one end to the plate 153 and at the other to the slide 465 tends to keep the blade 470 out of engagement with the terminals 471, 472, the stud 468 acting as an abutment against the opposed end of the slot 467.

Referring now to Figs. 3, 26, 28 and 41, there are mounted on the frame 8 electromagnets 480, one for each key 15 in unit 1, these magnets being suitably placed in relation to said key and controlled by the switch parts 470, 471, 472. An armature 481 preferably of plunger type is adapted to be controlled by the magnet 480, the latter being energized by the closing of the circuit and drawing the armature 481 downwardly. An arm 483 mounted to turn on stud 484 fixed in the frame 8 is freely connected to the armature 481. On the free end of the arm 483 is freely mounted a pawl 486, the free end of which is formed with a tooth 487. A lug 488 projecting rearwardly from the pawl 486 is connected to one end of a tension spring 489 the opposed end being secured to the frame 8. A pin 491 in the frame 8 acts as a stop to hold the arm 483 in its normal position of rest against the pull of the spring 489. A rachet wheel 495 adjacent the pawl 486 is fast on one end of the shaft 496 rotatably mounted in the frame 8, the opposed end of the shaft carrying a cam 497 fixed thereto. (See also Fig. 27.) A detent 498 is normally in operative engagement with the ratchet wheel 495 being freely mounted on a stud 499 fixed in the frame 8. A tension spring 500 anchored at one end to the frame 8 and connected at the other end to a lug 501 on the detent 498 serves to maintain contact between the ratchet wheel 495 and the detent 498.

As seen particularly in Figs. 16, 17, 18, 27 and 28, the cam 497 is operatively placed relative to a shaped end 505 formed on the arm 122 adapted for co-operation with suitably formed portions 506, on the periphery of the cam 497.

The operation of the locking device above described is as follows: As the tokens 151 near exhaustion, the weight 162 presents the depression 163 to the part 432 and the arm 430 is permitted to rock on the shaft 186 driven by the arm 455 under the impulse of the spring 456, thus carrying the shoulder 461 into the path of the projection 443. The prong 462 rests on the projection 443 and limits movement of the arm 460. On the next key operation which rocks the shaft 186 and thus raises the arms 187 and 188 for the ejection of a token 151, (as seen in Fig. 32) the projection 443 is carried into engagement with the shoulder 461 and the shaft 450 is thereby moved forward or toward the left as viewed in Fig. 32, driving the blade 470 into the switch terminals 471 and 472 and thus closing the circuit of the particular magnet 480 controlled. The bridging of the terminals 471 and 472 is preferably accomplished at about the end of the partial rotation of the shaft 186. The return of the arms 187 and 188 to their position of rest permits the return of the slide 465 under the impulse of the spring 475 and thus the circuit of the magnet is broken.

The magnet 480, momentarily energized, draws the arm 483 downward as shown by broken lines in Fig. 26. The angular motion of the arm 483 resulting causes the pawl 486 to rotate the ratchet wheel a desired distance, hence causing the cam 497 to rock the bell crank 110, (as shown in Fig. 27) the end 505 of the arm 122 and the formed portion 506 on the cam 497 co-operating. The notch 124 on the arm 109 may be thus rocked out of engagement with the pin 119 or thus held if it is desired that the pin 111 make the disengagement just prior to the energizing of the magnet 480. The return of the key bar 16 will thus find the tooth 117 in operative engagement with the teeth 118 and it will be thereby prevented from being depressed until the tooth 117 is again locked to prevent engagement with the teeth 118 as hereinafter described.

It will be understood that when the magnet 480 is deenergized by breaking the circuit through terminals 471 and 472 where the slide 465 is immediately returned to its normal position of rest, the armature 481 is raised by the spring 489 ready for a subsequent actuation, and the tooth 487 is held in operative position for actuating the shaft 496, also that the periphery of the cam 497 maintains the arm 122 in a position to keep the notch 124 clear of the path of the pin 119 until further partial rotation of the shaft 496 as hereinafter described. In other words successive energizings of a magnet 480 will alternately lock and unlock the key bar 16 controlled thereby.

Means are provided for permitting the operation of a key after the mechanism has been locked due to the exhaustion of tokens in the magazine as just previously described. It is preferable that the magazine be partially refilled before this release is permitted and that the drawer be withdrawn to facilitate this reloading and be reinstated into definite position before the mechanism is free to be operated. The embodied form of such means (see Figs. 35, 36, 37, and 38) includes a transverse bar 510 fixed on the under side of the drawer 150 at the upper end thereof and in definite relation to the lower end of the drawer. A slide 511 suitably placed relative to the bar 510 when the magazine drawer is in its operative position in the machine, has in either end slots 512 and 513 embracing freely studs 514 and 515 respectively, which are fastened to one of the plates 153. On these studs the slide may reciprocate. A shoulder 520 formed on one end of the slide 511 is suitably placed in the path of the bar 510 and adapted to be actuated thereby. A bent portion 521 is formed on the opposite end of the slide 511. A lever 524 freely mounted on a stud 525 fixed in the slide 511 has attached thereto at the point 526, a spring 527 under tension, the opposite end of the spring being fast to the stud 514. A free end 528 of the lever 524 is adapted to be supported by the bent portion 521, the spring 527 tending both to contact the bent portion 521 and the opposing edge of the arm 528 and flexibly to hold the slide 511 in its extreme upper or forward position, as clearly shown in Fig. 36, the studs 514 and 515 and opposing ends of the slots 512 and 513 maintaining this position when desired. The free end of the arm 528 has a prong 530 and the opposite arm 531 of the lever 524 has a doubly bevelled surface 532 and a nose 533.

Intermediate the block 474 and the prong 530 (Figs. 35 and 38) is a slide 540, similar to the slide 465. The slide 540 is formed with slots 541, 542 suitably embracing studs 544 and 545 respectively fixed in one of the plates 153 and thereby permitting limited reciprocal motion of the slide 540. A spring 550 under tension between the stud 544 and a pin 551 fast on the slide 540 is adapted flexibly to maintain the slide in a position with one end of each of the slots 541 and 542 bearing against the respective studs 544 and 545, as clearly seen in Fig. 38. A stud 555 is fixed on one end of the slide 540 and rotatably carries a bell crank lever 556 (see also Figs. 36 and 37) having an arm 557, formed at the free end thereof with a notch 558. To a depending arm 560 of the bell crank 556 is attached one end of a tension spring 561, the other end of which is connected to the slide 540 at 562. A pin 565 fast in the adjacent end of the slide 540 maintains the arm 557 in desired position relative to the prong 530. A pin 566 is fixed to the plate 153 and is operatively positioned relative to a face 567 of the arm 560. The opposed end of the slide 540 carries a switch blade 570 insulated therefrom and operatively positioned relative to switch terminals 571 and 572 connected respectively to the terminals 471 and 472 and hence in the circuit of the magnet 480.

As shown particularly in Figs. 31, 32, 35, and 38, a rock shaft 580 is rotatably mounted in the opposed plates 153, 153, suitably placed relative to the bar 510 when the drawer 165 is in its operative position. Fast on the rock shaft is an arm 581 having a notch 582 formed in its free end and also operatively placed relative to the bar 510 when the drawer 150 is in position. The rock shaft 580 also has fixed thereon an arm 583 which is freely connected at its free end to an arm 585 of a bell crank 586 rotatably mounted on a stud fast in the plate 153. A depending arm 588 of the bell crank 586 has freely mounted at its free end a stud fixed in a bar 591 near the forward end of said bar. At its opposite end the bar 591 has pin and slot engagement with the plate 153 permitting a limited reciprocal movement. A depending arm 595 (see also Fig. 34) is fast to the shaft 445 and has fixed in its free end a pin 596 which is freely embraced by a suitably shaped slot 597 in the bar 591. The slot is so positioned as to have an end operatively adjacent to the pin 596 when the arm 595 and the slide or bar 591 are in their normal positions of rest as shown in Fig. 38 and by broken lines in Fig. 35. A spring 600 under tension between a pin 601 fast to the bar 591 and a stud 602 fast in the plate 153 is adapted to maintain the bar 591 in its normal position of rest when desired, and, as shown in Fig. 35, the stud 602 being freely embraced by a slot 605 in the bar 591 serves as a midsupport for the bar.

As shown in Fig. 38 the notch 582 of the arm 581 engages the bar 510 to firmly lock the magazine drawer 150 in its operative position against an angle piece 610 at the lower end of the magazine fast to the plates 153, 153 (see also Fig. 32). As seen in Figs. 32, 35, and 38, a bell crank 612 freely mounted on a stud fast in the plate 153 has an upwardly extending arm 614, the free end of which is suitably positioned to coact when desired with a pin 615 fast in and projecting from the bar 540. Also extending from and a part of the bell crank 612, is an arm 620, whose free end has a notch 621 adapted to engage a pin 622 fast in and projecting from the bar 591. A spring 625 which is under tension between the arm 614 and a pin 626 fast in the plate 153, is adapted to effect cooperative engagement of the arm 620 with the pin 622.

The operation of the mechanism just described is as follows: It is assumed that as hereinbefore described the part 432 has found the recess 163 in the weight 162, most of the tokens having been ejected from the drawer 150 by successive operations of the key 15, but a predetermined number of the tokens remaining in the drawer. On the next operation of the key the shaft is rocked due to cooperative engagement of the shoulder 461 and the projection 443 of the arm 442 as shown in Fig. 32. This action closes the circuit through terminals 471 and 472 and the rock shaft 496 under impulse of the magnet 480, is given a partial rotation to a position such as shown in Fig. 27. The movement of the shaft 445 carries the arm 595 to the right as shown in Fig. 32, and through the engagement of the pin 596 with the opposed end of the slot 597 the bar 591 is carried to the position there shown. This movement permits the notch 621 of the arm 620 to engage the pin 622 and detachably lock the bar in this extreme position. The bell crank 586 is also rocked and through the connected mechanism the shaft 580 is given a partial rotation, thus detaching the arm 581 from the bar 510 and leaving the drawer 150 free to be withdrawn for reloading with tokens 151.

Fig. 35 shows the reinserted drawer 150 with the desired number of tokens reloaded therein and the weight 162 in its proper position. The full line of the rear end of the weight 162 shows the drawer 150 nearing its operative position and the broken line, the final position of rest of the latter. The upper portion of the beveled edges 532 of the arm 531 rests against the under side of the weight 162, thus swinging the prong 530 in a position to operatively engage the notch 558 of the arm 557. Further travel of the drawer 150 causes the bar 510 to engage the shoulder 520 of the slide 511, thus carrying the prong 530 into engagement with the arm 557 and moving the slide 540 so as to cause the blade 570 to bridge the terminals 571 and 572. The magnet 480 thus again energized and the rock shaft 496 given the desired rotation which permits the end 505 of the arm 122 to drop into a low dwell of the cam 497 under impulse of the spring 120, thus placing the notch 124 of the arm 109 in the path of the pin 119 to prevent engagement of the teeth 117 and 118 (see Fig. 28). The key bar 16 is now free to be operated as hereinbefore described.

As the slide 540 is approaching the limit of its operative movement the arm 560 is brought into engagement with the pin 566 and the further movement of the slide 540 rocks the bell crank 556 causing disengagement of arm 557 and the prong 530 and allowing the slide 540 to return to its normal position of rest, thereby breaking the circuit through terminals 571 and 572. It will be understood that the blade 570 closes the circuit of the magnet 480 preferably prior to the disengagement of the arm 557 and the prong 530. The magnet 480 is thus deenergized and the arm 483 restored to its normal position of rest with the pawl 487 in operative position for again rotating the rock shaft 496 when desired, (see Fig. 26).

As the slide 540 is driven as above described, the pin 615 rocks the bell crank 612 and disengages the notch 621 from the pin 622 as shown by broken lines in Fig. 35, and under the impulse of the spring 600 the bar 591 is returned to its position of rest or to the left as seen in Fig. 38. This movement, through the bell crank 586 and the arm 583 throws the arm 581 upwardly and the bar 510 is latched in position by engagement with the notch 582.

Referring to Figs. 36 and 37, it will be evident that an empty drawer replaced or one which is not desirably filled will leave the arm 531 in its inoperative position, the arm 557 will not be engaged, and the circuit through terminals 571 and 572 will still remain open. Hence, until a properly filled drawer is inserted, it will be impossible to depress the key bar 16.

Means are provided in the machine for visibly indicating the exhaustion of the tokens, and as embodied, (Figs. 32, 35, and 38) a blade 630 is fixed on the lower end of the bar 591 and preferably insulated therefrom. This blade is adapted to bridge terminals 631 and 632 fixed to but insulated from, the plate 153, thereby closing a circuit through a lamp 637 (see also Figs. 19, 29 and 41). It will be evident from the foregoing that the movement of the bar 591 by the arm 595 will cause the lamp 637 to be lighted and that the lamp 637 will remain incandescent until the replacement of a filled drawer 150 permits retrograde movement of the bar 591 as above described, when the circuit through terminals 631 and 632 will be broken.

Means are also provided to permit the removal of a drawer prior to the desired exhaustion of the tokens, if it be necessary, and to lock the key 15 corresponding to the drawer removed. As embodied in the invention, (see particularly Figs. 31, 32 and 38) one end of a link 640 is freely fixed on the arm 588 at 641, the opposed end having pin and slot engagement with the plate 153. As seen in Fig. 31 the bar 640 may be manually operated, the broken lines plainly showing the unlatching of the drawer and the forward movement of the bar 591.

Referring to Fig. 35 a bell crank lever 645 freely carried on a stud 646 fixed in the bar 591 has an arm 647 formed with a notch 648 and a prong 649, the two latter being operatively placed relative to the pin 596 of the arm 595. A downwardly projecting arm 650 is a part of the bell crank 645, as is also a lug 651. Between the latter and a pin 652 fixed in the bar 591 is a spring 655 under tension. The free end of the arm 650 is operatively placed relative to a pin 656 fixed in the plate 153 and projecting therefrom. The normal position of the bell crank 645 with the bar 591 in its forward or lefthand position, is shown by the broken lines, with the notch 648 engaging the pin 596. It will be evident that movement of the bar to the right in Fig. 35 will, through engagement of the notch 648 and the pin 596, rock the shaft 450 and thus carry the slide 465 and cause the desired contact of the blade 470 with the terminals 471 and 472 to energize the magnet 480 and prevent the depression of the key 15 corresponding to the drawer 150 thus removed. The full movement of the bar 591 causes coaction of the pin 656 and the arm 650 and rocks the bell crank 645 so as to free the pin 596 from the notch 648, thus resulting in the breaking of the circuit of magnet 480 by the return of the slide 465 to its normal position under the impulse of the spring 475. It will be understood that the drawer must be desirably filled with tokens and the weight 162 before replacement in order that the means for releasing the key 15 for depression may function as above described.

The various circuits so far referred to can be readily traced in the diagram Fig. 41. It will be recalled that for every key of the keyboard there is a corresponding remote signal or actuating magnet Y. In order to simplify the connection of circuits, particularly as the units are removable and should be quickly replaceable, I provide terminal boards 680 (see also Figs. 3 and 19) of insulation material mounted on the rear wall 5 of the machine casing. Each unit carries a corresponding terminal board 681 of insulation material secured to the wall 8 of the unit. Coacting spring contact fingers 682 and 683 are carried by the board 680 and 681 respectively in such relative position that the mere sliding of a new unit into the machine will cause the fingers 682 to engage with the finger 683 and make all the necessary electrical connections to the new unit.

In the diagram I have indicated an electric battery X as supplying current for operating the electrical devices on my machine. The electro-magnet Y is intended to represent any remote electrical device, signal, etc. or a means for initiating the actuation of an automatic machine. A circuit may be traced from one terminal of the battery X through a line 700, magnet Y, and a line 701 to the terminal 422. When through depression of a corresponding key the gap between terminals 422 and 423 is bridged by the blade 421, the circuit is completed by way of a line 702 and a line 703 to the other terminal of the battery. Thus at each depression of a key 15, a corresponding electrical device Y is energized or actuated at a point outside the machine.

Upon the initial depression of a key in a unit a lamp 385 is lighted to indicate to the customer which unit has been actuated and a lamp 384 is simultaneously lighted to illuminate the dial of the particular unit. These lights continue to burn until by operation of the handle lever 252 the dials are restored to normal zero position. The lamps are connected in parallel as shown. The circuit from the battery X leads by way of a line 704 through corresponding contact fingers 682, 683 and thence through the lamps 384 and 385 to the terminal 383. As soon as the dial moves out of normal zero position the corresponding blade 381 is depressed bridging the terminals 383 and 382 and the circuit is then completed by way of line 705, through another pair of coacting fingers 682 and 683, and line 703, back to the battery.

The electro-magnets 480 which lock and unlock the keys 15 are controlled respectively by the condition of the magazine drawers 150. The circuit of magnet 480 may be traced from one terminal of the battery X through lines 704, 706 and 707 to the terminals 471 and 571, while from the opposed terminals 472 and 572 the circuit may be traced through lines 708 and 709, contact fingers 682 and 683, magnet 480, line 705, another set of contact fingers 682 and 683, and line 703, to the battery. Normally this circuit is broken between the terminals 471, 571 and 472, 572. As explained above when the tokens have been practically exhausted from a magazine, the projection 432 on the lever 431 which is normally held down by the token, now finds the recess 163 and swings up therein as shown in Fig. 32. This brings the projection 443 on the lever 442 into operative engagement with the shoulder 461 on the lever 460 so that on the next actuation of the key 15 the slide 465 will be moved forward causing the blade 470 to bridge the gap between terminals 471 and 472 and thus actuate the magnet 480. As explained above successive energizings of the magnet 480 will alternately lock and unlock the corresponding key 15, and hence movement of the blade 470 to close the gap in the circuit of the magnet 480 will result in locking the key controlled by said magnet. The closure of the gap, however, is momentary and takes place only during the last key depression.

As the blade 470 moves forward into contacting position the bar 591 is moved in the opposite direction and the blade 630 carried thereby bridges the gap between the terminals 631 and 632. This completes a circuit through the lamp 637 which indicates which magazine drawer needs refilling. The circuit may be traced from battery X through lines 704, 706, 710, lamp 637, line 711 to terminal 631, and from terminal 632 by way of lines 712, 702 and 703 back to the battery. It will be recalled that when the bar 591 moves rearward out of normal position it is locked fast and is not released until a filled magazine drawer has been introduced.

Hence the lamp 637 will remain lighted until the depleted drawer has been refilled or replaced with a spare. A lamp 637a, through the lines 710 and 716, is essentially in parallel with the lamp 637 and is located at a conveniently remote point. When illuminated, it will inform the proper agent which of the drawers 150 has been depleted of tokens and will enable him to immediately bring to the machine ready for insertion, a spare drawer filled with tokens of the same kind. It is obvious that the lamp 637a acting as an indicator in this manner will facilitate the replacement of the drawer and materially decrease the amount of time a particular key 15 remains inoperative due to the exhaustion of tokens.

The magnet 480 having been actuated by movement of blade 470 to lock the corresponding key 15, the next actuation of the magnet will unlock the key. The second actuation of the magnet is effected by the blade 570 bridging terminals 571 and 572. This takes place when a filled drawer is introduced into the magazine. As explained above the slide 540 bearing the blade 570 will not be actuated unless the drawer is properly filled. Hence not until a plentiful supply of tokens is on hand will the operator be able to actuate the keys of the unit.

At the upper end of the bar 591 there is a blade 660 (see Figs. 32, 35, 38 and 41) adapted to bridge terminals 661 and 662 fixed to but insulated from the plate 153. It will be observed that the bar 591 by its position either closes the gap between the terminals 631 and 632 or the gap between the terminals 661 and 662. Normally the latter gap is closed. The terminal 662 is connected to the line 710 and the terminal 661 is connected by a line 713, switch Z, line 714 and line 715 to the line 709. Thus a separate circuit controlled by the blade 660 and the switch Z, is provided for energizing the magnet 480. Normally this circuit is open at the switch Z, but whenever desired the magnet 480 may be energized to lock a corresponding key 15 by throwing the switch Z. If, however, the key has already been locked by action of the blade 470 the circuit through the switch Z will be broken by the rearward movement of the bar 591 so that it will be impossible for anyone to unlock a key by throwing the switch Z until the drawer has been refilled and the blade 660 has returned to its normal position bridging terminals 661 and 662. The switch Z is preferably placed at a remote station where the magnets Y are located and serves as a control at said remote station for preventing the further issuance of tokens. In order to couple up the lines from the machine to the battery, the magnet Y, the switch Z and the lamp 637a, I provide jacks or other quick acting connecting means P, R, S, T, U and V in the lines 716, 713, 714, 701, 704, and 703 respectively.

While I have described in detail a preferred embodiment of my invention, I do not limit myself to the specific construction detailed, but I reserve the right to make such variations, alterations and modifications in construction and arrangement of parts as fall within the spirit and scope of the appended claims.

I claim:

1. A token-delivering machine including in combination a magazine having a removable drawer adapted to contain tokens, means for uttering tokens from the drawer, means for locking the drawer in the magazine, and means controlled by the tokens in the drawer for unlocking said drawer when the tokens therein are nearing exhaustion.

2. In a token-delivering machine, a magazine, a drawer therein adapted to contain tokens, mechanism for uttering tokens from the drawer, a lock operating on alternate actuations thereof to lock and unlock said mechanism, a latch for fastening the drawer in the magazine, means actuated by said mechanism for unlatching the drawer and actuating the lock when the tokens in the drawer near depletion, and means controlled by the insertion of a filled drawer for actuating the lock.

3. In a token-delivering machine, a magazine, a drawer therein adapted to contain tokens, mechanism for uttering tokens from the drawer, a lock operating on alternate actuation thereof to lock and unlock said mechanisms, a latch for fastening the drawer in the magazine, means actuated by said mechanism for unlatching the drawer and actuating the lock when the tokens in the drawer near depletion, means controlled by the insertion of a filled drawer for actuating the lock, remote control means for actuating said lock, and means for rendering the remote control means inoperative when the drawer is unlatched.

4. In a token-delivering machine, a drawer adapted to contain tokens, a casing in which the drawer is adapted to be inserted, latch mechanism controlled by the number of tokens in the drawer and operating on insertion of the drawer only when the drawer has been filled to a predetermined extent to latch the drawer in the casing, means for uttering tokens from the drawer, a lock for the token-uttering means, means controlled by said latch mechanism for unlocking said lock when a filled drawer is inserted in the casing, and means actuated by the token-uttering means for locking the token-uttering means and unlatching the drawer when a predetermined depletion of tokens in the drawer has been reached.

5. In a token-delivering machine, a drawer adapted to contain tokens, a casing in which the drawer is adapted to be inserted, latch mechanism controlled by the number of tokens in the drawer and operating on insertion of the drawer only when the drawer has been filled to a predetermined extent to latch the drawer in the casing, means for uttering tokens from the drawer, a lock for the token-uttering means, means controlled by said latch mechanism for unlocking said lock when a filled drawer is inserted in the casing, means actuated by the token-uttering means for locking the token uttering-means and unlatching the drawer when a predetermined depletion of tokens in the drawer has been reached, and means for manually latching the drawer and unlocking the token-uttering means when a partly filled drawer is inserted in the casing.

6. In a token delivering machine a magazine casing providing an inclined guideway, a token drawer adapted to be fitted into the guideway, ejecting means for ejecting tokens from the lower end of the drawer, a weight urging the tokens toward the ejecting end of the drawer, a feeler adapted to project into the magazine nearer the lower end thereof, the weight being formed with a recess into which the feeler enters when the tokens in the magazine near exhaustion, a lock for the ejecting mechanism, and means controlled by said feeler for operating said lock.

7. In a token delivering machine a magazine casing providing an inclined guideway, a token drawer adapted to be fitted into the guideway, a latch for normally holding the drawer in the casing, ejecting mechanism for ejecting tokens from the lower end of the drawer, a weight urging the tokens toward the ejecting end of the drawer, a feeler adapted to project into the magazine near the lower end thereof, the weight being formed with a recess to admit the feeler when the tokens in the magazine near exhaustion, a lock for the ejecting mechanism, and means controlled by entrance of the feeler into said recess and actuated by the ejecting mechanism for operating said lock to lock the ejecting mechanism and for operating said latch to release the drawer.

8. In a machine of the character described a removable token magazine, means for ejecting tokens therefrom, means for preventing operation of the ejecting means when the magazine nears exhaustion, and means operable only by the replaced filled magazine for restoring the ejecting means to operative condition.

9. A token delivering mechanism including in combination a closed container, an open receptacle, means for ejecting a token into the container, and means inaccessible from the receptacle for discharging the token from the container into said receptacle.

10. A token delivering mechanism including in combination a plurality of token magazines, means for selectively ejecting tokens from said magazines, a container common to all said magazines in which the ejected tokens are inaccessibly retained, an open receptacle and means inaccessible from the receptacle for discharging the tokens from the container into the receptacle.

11. In a token delivering machine, a casing, a holder for a supply of tokens in the casing, a latch for securing the holder in the casing, mechanism for ejecting tokens from the holder, and means controlled by the ejecting mechanism when the supply of tokens is nearing exhaustion for unlatching the holder.

12. In a token delivering machine, a casing, a holder for a supply of tokens in the casing, a latch for securing the holder in the casing, mechanism for ejecting tokens from the holder, a lock for said mechanism, means controlled by the ejecting mechanism when the supply of tokens is nearing exhaustion for locking said mechanism and unlatching the holder to permit of withdrawing the holder, and means controlled by the insertion of a filled holder in the casing for unlocking said ejecting mechanism and operating the latch to secure the filled holder in the casing.

Signed at New York in the county of New York and State of New York this 14th day of May A. D. 1927.

HARRY RUSSELL BRAND.